US008140786B2

(12) United States Patent
Bunte et al.

(10) Patent No.: US 8,140,786 B2
(45) Date of Patent: Mar. 20, 2012

(54) SYSTEMS AND METHODS FOR CREATING COPIES OF DATA, SUCH AS ARCHIVE COPIES

(75) Inventors: Alan Bunte, Monmouth Beach, NJ (US); Anand Prahlad, East Brunswick, NJ (US); Brian Brockway, Shrewsbury, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 1003 days.

(21) Appl. No.: 11/950,376

(22) Filed: Dec. 4, 2007

(65) Prior Publication Data

US 2008/0229037 A1    Sep. 18, 2008

Related U.S. Application Data

(60) Provisional application No. 60/882,884, filed on Dec. 29, 2006, provisional application No. 60/871,737, filed on Dec. 22, 2006, provisional application No. 60/882,883, filed on Dec. 29, 2006, provisional application No. 61/001,485, filed on Oct. 31, 2007, provisional application No. 60/868,518, filed on Dec. 4, 2006.

(51) Int. Cl.
    *G06F 12/00* (2006.01)
(52) U.S. Cl. ............ 711/161; 711/E12.06; 711/E12.103
(58) Field of Classification Search ........................ None
    See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |

(Continued)

FOREIGN PATENT DOCUMENTS

EP    0259912    3/1988

(Continued)

OTHER PUBLICATIONS

Webopedia, "Data Duplication", Aug. 31, 2006, pp. 1-2, http://web.archive.org/web/20060913030559/http://www.webopedia.com/TERM/D/data_deduplication.html.*

(Continued)

*Primary Examiner* — Edward Dudek, Jr.
*Assistant Examiner* — Christopher Birkhimer
(74) *Attorney, Agent, or Firm* — Perkins Coie LLP

(57) ABSTRACT

A system and method of creating archive copies of data sets is described. In some examples, the system creates an archive copy from an original data set. In some examples, the system creates an archive copy when creating a recovery copy for a data set. In some examples, the system creates a copy without redundant data, and then encrypts the data set.

13 Claims, 20 Drawing Sheets

U.S. PATENT DOCUMENTS

| | | | |
|---|---|---|---|
| 5,410,700 A | 4/1995 | Fecteau et al. | |
| 5,437,012 A * | 7/1995 | Mahajan | 711/111 |
| 5,448,724 A | 9/1995 | Hayashi | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,742,792 A * | 4/1998 | Yanai et al. | 711/162 |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,008 A | 9/1998 | Benson et al. | |
| 5,813,009 A | 9/1998 | Johnson et al. | |
| 5,813,017 A | 9/1998 | Morris | |
| 5,822,780 A * | 10/1998 | Schutzman | 711/165 |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,940,833 A | 8/1999 | Benson | |
| 5,950,205 A | 9/1999 | Aviani, Jr. | |
| 5,974,563 A | 10/1999 | Beeler, Jr. | |
| 5,990,810 A | 11/1999 | Williams | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,311,252 B1 * | 10/2001 | Raz | 711/117 |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,421,711 B1 | 7/2002 | Blumenau et al. | |
| 6,487,561 B1 | 11/2002 | Ofek et al. | |
| 6,513,051 B1 | 1/2003 | Bolosky et al. | |
| 6,519,679 B2 | 2/2003 | Devireddy et al. | |
| 6,538,669 B1 | 3/2003 | Lagueux, Jr. et al. | |
| 6,564,228 B1 | 5/2003 | O'Connor | |
| 6,609,183 B2 * | 8/2003 | Ohran | 711/161 |
| 6,609,187 B1 * | 8/2003 | Merrell et al. | 711/173 |
| 6,658,526 B2 | 12/2003 | Nguyen et al. | |
| 6,704,730 B2 | 3/2004 | Moulton et al. | |
| 6,745,304 B2 * | 6/2004 | Playe | 711/161 |
| 6,757,699 B2 * | 6/2004 | Lowry | 1/1 |
| 6,757,794 B2 | 6/2004 | Cabrera et al. | |
| 6,795,903 B2 * | 9/2004 | Schultz et al. | 711/154 |
| 6,810,398 B2 | 10/2004 | Moulton | |
| 6,868,417 B2 | 3/2005 | Kazar et al. | |
| 6,901,493 B1 * | 5/2005 | Maffezzoni | 711/162 |
| 6,928,459 B1 | 8/2005 | Sawdon et al. | |
| 6,952,758 B2 | 10/2005 | Chron et al. | |
| 6,959,368 B1 * | 10/2005 | St. Pierre et al. | 711/162 |
| 6,976,039 B2 * | 12/2005 | Chefalas et al. | 1/1 |
| 6,993,162 B2 * | 1/2006 | Stephany et al. | 382/118 |
| 7,017,113 B2 | 3/2006 | Bourbakis et al. | |
| 7,035,943 B2 | 4/2006 | Yamane et al. | |
| 7,089,395 B2 * | 8/2006 | Jacobson et al. | 711/202 |
| 7,111,173 B1 * | 9/2006 | Scheidt | 713/186 |
| 7,117,246 B2 | 10/2006 | Christenson et al. | |
| 7,143,091 B2 | 11/2006 | Charnock et al. | |
| 7,191,290 B1 | 3/2007 | Ackaouy et al. | |
| 7,246,272 B2 | 7/2007 | Cabezas et al. | |
| 7,272,606 B2 | 9/2007 | Borthakur et al. | |
| 7,287,252 B2 | 10/2007 | Bussiere et al. | |
| 7,320,059 B1 | 1/2008 | Armangau et al. | |
| 7,325,110 B2 | 1/2008 | Kubo et al. | |
| 7,395,282 B1 | 7/2008 | Crescenti et al. | |
| 7,444,382 B2 | 10/2008 | Malik | |
| 7,444,387 B2 | 10/2008 | Douceur et al. | |
| 7,478,113 B1 | 1/2009 | De Spiegeleer et al. | |
| 7,487,245 B2 | 2/2009 | Douceur et al. | |
| 7,496,604 B2 | 2/2009 | Sutton, Jr. et al. | |
| 7,647,462 B2 | 1/2010 | Wolfgang et al. | |
| 7,661,028 B2 | 2/2010 | Erofeev | |
| 7,685,177 B1 | 3/2010 | Hagerstrom et al. | |
| 7,685,459 B1 | 3/2010 | De Spiegeleer et al. | |
| 7,698,699 B2 | 4/2010 | Rogers et al. | |
| 7,870,486 B2 | 1/2011 | Wang et al. | |
| 2001/0037323 A1 * | 11/2001 | Moulton et al. | 707/1 |
| 2002/0099806 A1 | 7/2002 | Balsamo et al. | |
| 2002/0107877 A1 | 8/2002 | Whiting et al. | |
| 2003/0033308 A1 | 2/2003 | Patel et al. | |
| 2003/0110190 A1 | 6/2003 | Achiwa et al. | |
| 2003/0182310 A1 * | 9/2003 | Charnock et al. | 707/104.1 |
| 2004/0148306 A1 * | 7/2004 | Moulton et al. | 707/101 |
| 2004/0230817 A1 | 11/2004 | Ma | |
| 2004/0250033 A1 | 12/2004 | Prahlad et al. | |
| 2005/0033756 A1 | 2/2005 | Kottomtharayil et al. | |
| 2005/0066190 A1 * | 3/2005 | Martin | 713/200 |
| 2005/0086443 A1 | 4/2005 | Mizuno et al. | |
| 2005/0114406 A1 | 5/2005 | Borthakur et al. | |
| 2005/0131900 A1 | 6/2005 | Palliyll et al. | |
| 2005/0182780 A1 * | 8/2005 | Forman et al. | 707/101 |
| 2005/0203864 A1 | 9/2005 | Schmidt et al. | |
| 2005/0234823 A1 * | 10/2005 | Schimpf | 705/50 |
| 2005/0262194 A1 * | 11/2005 | Mamou et al. | 709/203 |
| 2006/0005048 A1 | 1/2006 | Osaki et al. | |
| 2006/0010227 A1 | 1/2006 | Atluri | |
| 2006/0047894 A1 * | 3/2006 | Okumura | 711/111 |
| 2006/0053305 A1 | 3/2006 | Wahlert et al. | |
| 2006/0056623 A1 * | 3/2006 | Gligor et al. | 380/28 |
| 2006/0174112 A1 * | 8/2006 | Wray | 713/168 |
| 2006/0224846 A1 | 10/2006 | Amarendran et al. | |
| 2006/0230244 A1 | 10/2006 | Amarendran et al. | |
| 2006/0242489 A1 | 10/2006 | Brockway et al. | |
| 2007/0022145 A1 | 1/2007 | Kavuri | |
| 2007/0118705 A1 | 5/2007 | Arakawa et al. | |
| 2007/0179995 A1 | 8/2007 | Prahlad et al. | |
| 2007/0198613 A1 | 8/2007 | Prahlad et al. | |
| 2007/0203937 A1 | 8/2007 | Prahlad et al. | |
| 2007/0255758 A1 | 11/2007 | Zheng et al. | |
| 2008/0028007 A1 | 1/2008 | Ishii et al. | |
| 2008/0098083 A1 | 4/2008 | Shergill et al. | |
| 2008/0162320 A1 | 7/2008 | Mueller et al. | |
| 2008/0162518 A1 | 7/2008 | Bollinger et al. | |
| 2009/0106480 A1 | 4/2009 | Chung | |
| 2009/0112870 A1 | 4/2009 | Ozzie et al. | |
| 2009/0132619 A1 | 5/2009 | Arakawa et al. | |
| 2009/0144285 A1 | 6/2009 | Chatley et al. | |
| 2009/0177719 A1 | 7/2009 | Kavuri | |
| 2009/0204649 A1 | 8/2009 | Wong et al. | |
| 2010/0094817 A1 | 4/2010 | Ben-Shaul et al. | |
| 2010/0161554 A1 | 6/2010 | Datuashvili et al. | |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |

| | | |
|---|---|---|
| EP | 0981090 | 2/2000 |
| WO | WO-95/13580 | 5/1995 |
| WO | WO-99/12098 | 3/1999 |

OTHER PUBLICATIONS

Federal Information Processing Standards Publication 180-2, "Secure Hash Standard", Aug. 1, 2002, pp. 1-83 http://csrc.nist.gov/publications/fips/fips180-2/fips180-2withchangenotice.pdf.*

Menezes et al., "Handbook of Applied Cryptography", CRC Press, 1996, pp. 321-383 http://www.cacr.math.uwaterloo.ca/hac/about/chap9.pdf.*

Microsoft, "Computer Dictionary", Fifth Edition, 2002, p. 249.*

SearchStorage, "File System", Nov. 1998, pp. 1-10, http://searchstorage.techtarget.com/definition/file-system.*

CommVault Systems, Inc., "Deduplication," <http://documentation.commvault.com/commvault/release_8_0_0/books_online_1/english_US/features/single_instance/single_instance.htm>, internet accessed on May 21, 2009, 9 pages.

CommVault Systems, Inc., "Deduplication—How to," <http://documentation.commvault.com/commvault/release_8_0_0/books_online_1/english_US/features/single_instance/single_instance_how_to.htm>, internet accessed on May 21, 2009, 7 pages.

U.S. Appl. No. 12/626,839, filed Nov. 27, 2009, Klose, Michael F.

Diligent Technologies "HyperFactor," <http://www.diligent.com/products:protecTIER-1:HyperFactor-1>, Internet accessed on Dec. 5, 2008, 2 pages.

Overland Storage, "Data Deduplication," <http://www.overlandstorage.com/topics/data_deduplication.html>, Internet accessed on Dec. 5, 2008, 2 pages.

Lortu Software Development, "Kondar Technology-Deduplication," <http://www.lortu.com/en/deduplication.asp>, Internet accessed on Dec. 5, 2008, 3 pages.

Quantum Corporation, "Data De-Duplication Background: A Technical White Paper," May 2008, 13 pages.

Kornblum, Jesse, "Identifying Almost Identical Files Using Context Triggered Piecewise Hashing," www.sciencedirect.com, Digital Investigation 3S (2006), pp. S91-S97.

International Search Report and Written Opinion, International Application No. PCT/US2009/58137, Mail Date Dec. 23, 2009, 14 pages.

U.S. Appl. No. 11/963,623, Gokhale.
U.S. Appl. No. 12/058,178, Kottomtharayil.
U.S. Appl. No. 12/058,317, Kottomtharayil.
U.S. Appl. No. 12/058,367, Kottomtharayil.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 12/145,342, filed Jun. 24, 2008, Gokhale.
U.S. Appl. No. 12/145,347, filed Jun. 24, 2008, Gokhale.
U.S. Appl. No. 12/647,933, filed Jul. 3, 2008.
U.S. Appl. No. 12/647,906, filed Dec. 28, 2009, Attarde et al.
U.S. Appl. No. 12/649,454, filed Dec. 30, 2009, Muller et al.

Commvault Systems, Inc., "Continuous Data Replicator 7.0," Product Data Sheet, 2007.

U.S. Appl. No. 12/565,576, filed Sep. 23, 2009, Kottomtharayil et al.
U.S. Appl. No. 13/251,022, filed Sep. 30, 2011, Gokhale.

* cited by examiner

US 8,140,786 B2

SYSTEMS AND METHODS FOR CREATING COPIES OF DATA, SUCH AS ARCHIVE COPIES

CROSS-REFERENCE TO RELATED APPLICATION(S)

This application claims priority to the following patent applications, all of which are incorporated by reference in their entirety: U.S. Provisional Patent Application No. 60/882,884, filed on Dec. 29, 2006, entitled SYSTEMS AND METHOD FOR CREATING COPIES OF DATA, SUCH AS REFERENCE ARCHIVE COPIES, U.S. Provisional Patent Application No. 60/871,737, filed on Dec. 22, 2006, entitled SYSTEM AND METHOD FOR STORING REDUNDANT INFORMATION, U.S. Provisional Patent Application No. 60/882,883, filed on Dec. 29, 2006, entitled SYSTEM AND METHOD FOR ENCRYPTING DATA TO BE ARCHIVED, U.S. Provisional Patent Application No. 61/001,485, filed on Oct. 31, 2007, entitled SYSTEM AND METHOD FOR ENCRYPTING DATA TO BE ARCHIVED, and U.S. Provisional Application No. 60/868,518, filed on Dec. 4, 2006, entitled METHOD AND SYSTEM FOR RETENTION OF DOCUMENTS.

This application incorporates the following applications by reference: U.S. patent application Ser. No. 11/694,869, filed on Mar. 30, 2007, entitled METHOD AND SYSTEM FOR OFFLINE INDEXING OF CONTENT AND CLASSIFYING STORED DATA, and U.S. patent application Ser. No. 11/564,119, filed on Nov. 28, 2006, entitled SYSTEMS AND METHODS FOR CLASSIFYING AND TRANSFERRING INFORMATION IN A STORAGE NETWORK.

BACKGROUND

Corporations and other organizations routinely copy data produced and/or stored by their computer systems in order to retain an archive of the data. For example, a company might retain data from computing systems related to e-commerce, such as databases, file servers, web servers, and so on. The company may also retain data from computing systems used by employees, such as those used by an accounting department, marketing department, engineering, and so on.

Often, such retention and/or archiving amasses large amounts of data. There may be data copied or retained by way of periodic or one-time backups, continuous data protection (CDP) backups, snapshot backups, and so on. The data may include personal data, such as financial data, customer/client/patient contact data, audio/visual data, and other types of data. Organizations may also retain data related to the correct operation of their computer systems, such as operating system files, application files, user settings, and so on.

Once the stored data has aged a certain amount of time, the data storage systems may send the data to a data archive that stores the data for as long as is required. Typical data storage systems create a first storage copy for short term data recovery and after a certain time send the copies to an archive for long term storage. Thus, organizations are storing large amounts of data in their data archives at great expense.

Organizations increasingly rely on computer systems to produce and store critical information and the retention and recovery of data may cause problems in their operation and overall effectiveness. For example, a data storage system may receive an identification of a file location to store and create one or more storage files containing the contents of the stored file and/or location. The data storage system can then restore data from these storage files (such as backup files) should anything happen to the original data.

At times, organizations may want to quickly access data stored in their data archives. For example, an organization may receive a discovery request for a small amount of email data. Although the amount of requested data may be small, the data storage system may need to search many archive files (such as backup tapes) to find the requested data.

Companies are often required to retain documents in archive files in order to comply with various regulations. For example, when a company is in litigation, the company may be required to retain documents related to the litigation. Employees are often asked not to delete any correspondence, emails, or other documents related to the litigation. Recently enacted amendments to Federal Rules of Civil Procedure (FRCP) place additional document retention burdens on a company. According to Gartner, "Several legal commentators believe that the heart of the proposed changes to FRCP is the formal codification of "electronically stored information" (ESI) and the recognition that the traditional discovery framework dealing with paper-based documents is no longer adequate." Legal discovery of electronic information has emerged as a key requirement for today's enterprise in recent years, and the new federal rules both strengthen and expand those requirements.

Complying with all of the regulations related to document retention can be difficult, particularly when many employees may have relevant documents stored under their control that are relevant to the issue at hand. Penalties for violation of regulations related to document retention can be steep, and executives and business managers want confidence that employees are taking appropriate steps to comply with the regulations. Employees may forget about requests to retain documents, or may not think that a particular document is relevant when others would disagree.

Companies also need provisions for finding retained documents. Traditional search engines accept a search query from a user, and generate a list of search results. The user typically views one or two of the results and then discards the results. However, some queries are part of a longer-term, collaborative process. For example, when a company receives a legal discovery request, the company is often required to mine all of the company's data for documents responsive to the discovery request. This typically involves queries of different bodies of documents lasting days or even years. Many people are often part of the query, such as company employees, law firm associates, and law firm partners. The search results must often be viewed by more than one of these people in a well-defined set of steps (i.e., a workflow). For example, company employees may provide documents to a law firm, and associates at the law firm may perform an initial reading of the documents to determine if the documents contain relevant information. The associates may flag documents with descriptive classifications such as "relevant" or "privileged." Then, the flagged documents may go to a law firm partner that will review each of the results and ultimately respond to the discovery request with the set of documents that satisfies the request.

Collaborative document management systems exist for allowing multiple users to participate in the creation and revision of content, such as documents. Many collaborative document management systems provide an intuitive user interface that acts as a gathering place for collaborative participants. For example, Microsoft Sharepoint Server provides a web portal front end that allows collaborative participants to find shared content and to participate in the creation of new content and the revision of content created by others. In addition to directly modifying the content of a document, collaborative participants can add supplemental information, such as comments to the document. Many collaborative document management systems also provide workflows for defining sets of steps to be completed by one or more collaborative participants. For example, a collaborative document management system may provide a set of templates for performing common tasks, and a collaborative participant may be guided through a wizard-like interface that asks interview-style questions for completing a particular workflow.

The foregoing examples of some existing problems with data storage, archiving, and restoration are intended to be illustrative and not exclusive. Other limitations will become apparent to those of skill in the art upon a reading of the Detailed Description below.

COPYRIGHT NOTICE

Figure 1A:
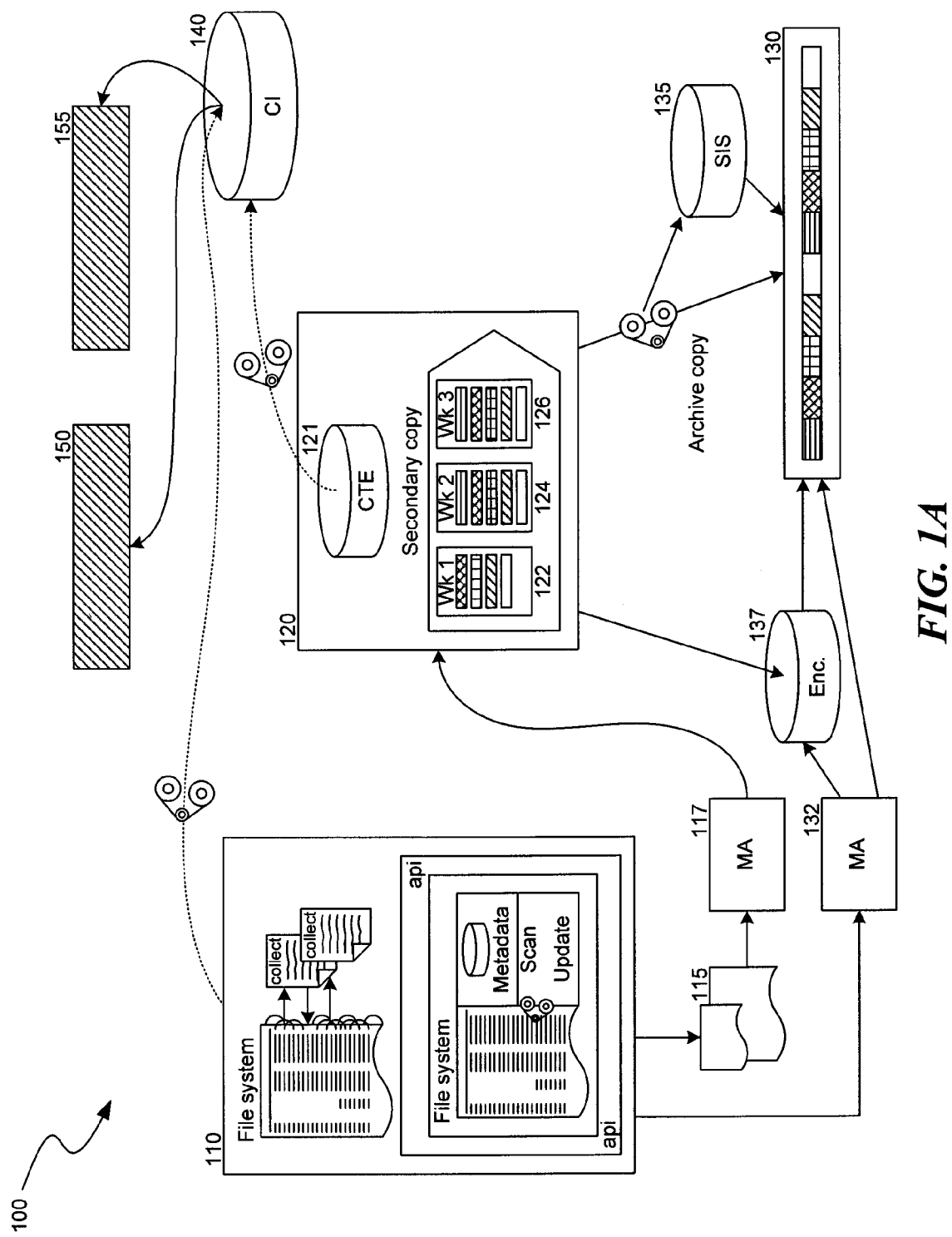
FIG. 1A is a block diagram illustrating a data archival and data retrieval system.

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology provided below describe systems and methods of creating an archive copy or copies of a data set. Although described in connection with certain examples, the systems described herein are applicable to and may employ any wireless or hard-wired network or data storage system that stores and conveys data and information from one point to another, including communication networks, enterprise networks, storage networks, and so on.

Examples of the technology describe a method and system of creating an archive copy from one or more secondary copies that are created from an original data set, or primary or production copy, such as data from a file system. For example, instead of using certain types of secondary copies, such as recovery copies, snapshot volumes, and so on, to archive data (e.g., waiting until a recovery copy has aged a certain time period and then storing some or all of the recovery copy as an archive copy), the system creates an archive copy of the data during or soon after creating other secondary copies. That is, the system may create a certain type of secondary copy that may be used for long term archival purposes from any data under management by the system. For example, this copy may be single instanced and then encrypted, unlike other secondary copies under management by the system.

Alternatively, examples of the technology describe a method and system of creating the archive copy directly from the primary copy (i.e., the original data set), such as the primary copy of a file system, an exchange server, a SQL database, and so on. For example, the system may create an archive copy of data without first making creating other secondary copies.

Furthermore, examples of the technology describe a method and system of creating an archive copy from a previously archived data set, such as a data set archived using a different system. For example, the system may receive an archived data set, extract the data, and create an archive copy of the data using the methods described herein.

In some cases, the system may reduce, remove, or erase redundant data when creating the archive copy. For example, the system may remove data objects already under management by the system, such as files, emails, attachments, application data, and so on. Thus, the system may only transfer data objects not previously stored to the archive copy, reducing the time to create the archive copy by only transferring new or modified data objects and reducing the cost to create the archive copy by using fewer resources in creating the archive copy.

In some cases, the system may index the content of the data when creating the archive copy. Instead of indexing data at a data source (such as at the file system), the system may index the data as it transfers the data to the archive copy. Such indexing may allow users of the system to search for and retrieve data from an archive copy via search user interfaces. Thus, the system may create a data archive that is easily searchable by users, reducing the cost of resources and time for data retrieval requests, such as discovery requests.

In some cases, the system may encrypt or otherwise add security to the data or a portion of the data when creating the archive copy. For example, instead of encrypting a recovery copy (or other copies of an original data set that may not require secure storage), the system optionally encrypts the archive copy during or after creating that copy, in order to provide a secure but restorable data set for deployment to offsite locations.

In some cases, the system first single instances (that is, removes any redundant data) when creating the archive copy and then encrypts the archive copy. For example, the system may receive data to be archived, single instance the data by comparing the data to other data under management by the system, and then encrypt the data not found in the comparison. The system may create two separate databases when creating the archive copy, one that stores information related to the data (such as unique hashes computed for all data within a data set) and one that stores information identifying locations where archived copies of the data set are stored.

Examples of the technology employ the archive copies described herein to assist in complying with document retention regulations and to leverage a collaborative document management system to improve searches for multiple users. The system may look to the archive copies along with a data classification and content indexing system when searching a company's documents, email, and other content.

In some cases, the search may be based on keywords within a document or supplemental information, such as data classification tags associated with the document and other metadata. Searches may be performed on live data within the company as well as on archive copies, other secondary copies, and across all data under management by the system. The system may also maintain an index of all of the content available anywhere under management.

In some cases, the system may secure search results based on a company's data using a security system. For example, some users may not have access to documents containing certain keywords or related to sensitive company information such as trade secrets or business strategy.

In some cases, the system employs a media management system to manage and control the movement of data to and from media and media storage libraries. Thus, a document retention system that interoperates with a content indexing system, a security system, a media management system, and a collaborative document management system can provide an integrated document retention and collaborative search experience to a user.

Various examples of the technology will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram illustrating a data archival and data retrieval system 100 is shown. Unless described otherwise herein, aspects of the system may be practiced with conventional systems. Thus, the construction and operation of the various blocks shown in FIG. 1 may be of conventional design, and need not be described in further detail herein to make and use the system, because such blocks will be understood by those skilled in the relevant art. One skilled in the relevant art can readily make any modifications necessary to the blocks of FIG. 1 (or other examples or Figures) based on the detailed description provided herein.

The system 100 may include a file system 110 that creates, modifies and/or updates originally created data 115 (that is, data is first created by file system 110). The created data may be called a primary copy or production copy of the data. Alternatively, data may be a primary copy from within an exchange server, a SQL database, and so on. The system 100 may perform various data storage operations and data transfers in order to make a secondary copy 120 of the original data 115, such as a recovery copy, using a media agent 117. For example, the system 100 may copy data on a daily or weekly basis. In the example of FIG. 1, the secondary copy 120 contains data for a first week 122, a second week 124, and/or a third week 126. The system 100 may also create an index 140 of the content of the data 115 from the secondary copy 120 or from the primary copy, using the media agent 117 or components within the media agent, such as a content tracking engine 121. Using the index, the system may facilitate searches of the content of the data 115, such as searches of the data content, metadata associated with the data, and so on. The system may facilitate searches from end users via an end user search 150 component, such as a web browser, or from system administrators via a discovery search component 155, such as an administrator dashboard or application graphical user interface.

Additionally, the system 100 creates an archive copy 130 of the original data 115 using an archive copy component 132, such as a media agent used to create archive copies. The archive copy component 132 may communicate and interact with the media agent 117 that creates the index 140, allowing archived data to be indexed by the media agent 117 and later searched by one of the searched components 150 and/or 155. The archive component 132 may also utilize a data redundancy component 135, or single instancing system, that reduces or removes some or all of the redundant data under management by the system, e.g. data within the secondary copies 122, 124, 126 when creating the archive copy 130 via the archive component 132. The system may also encrypt the data via an encryption system 137, either during or after the data is single instanced.

In some cases the system 100 enables organizations to create an archive copy of their data without using primary system resources (via the data from the secondary copies 122, 124, 126), such as resources near or located with the file system 110, without relying on the originally generated secondary copies themselves as being suitable for archival purposes Furthermore, the system 100 may index the data and create a content index 140, and may eliminate or reduce any unnecessary copying of data to the data archive via the single instancing component 135.

Figure 1B:
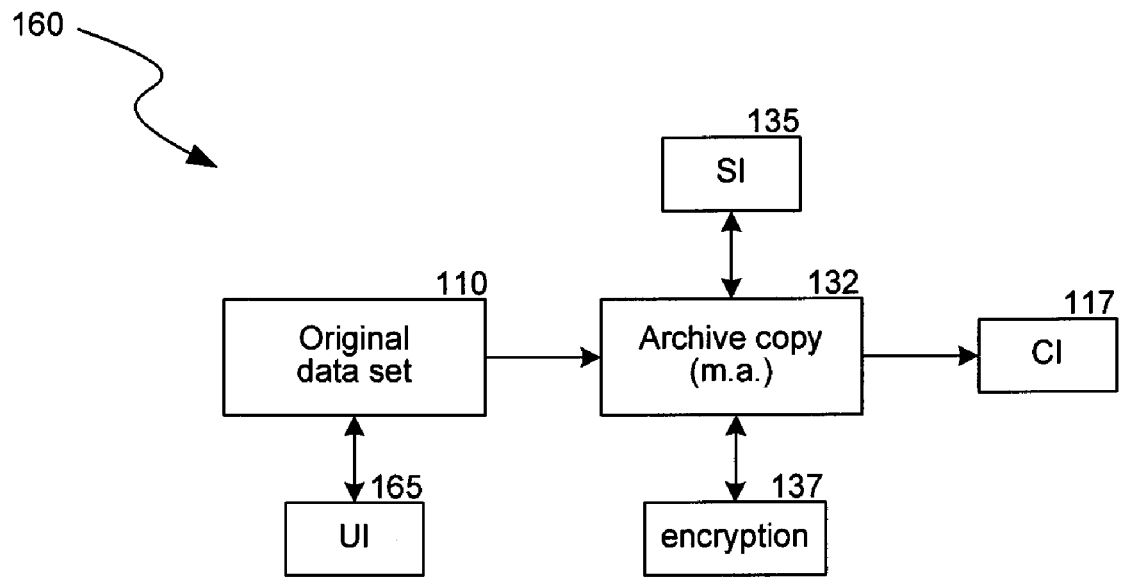
FIG. 1B is a block diagram illustrating an alternative data archival system.

In some cases, the system may create archive copies of data from an original data set, or primary copy. Referring to FIG. 1B, a block diagram 160 illustrating an alternative data archival system that creates an archive copy from an original data set (such as data created by a file system) is shown. For example, a file system containing the original data set 110 may receive a request from a user to initiate an archiving process, such as via graphical user interface 165 in communication with the file system. The GUI 165 may receive a request from a user, such as a system administrator, to archive a subset of the primary copy, such as a file, a group of files, and so on. For example, the system administrator may select, via the GUI 165, one or more files to archive.

Upon receiving the request, the system instructs the media agent 132 to create an archive copy of the selected files. As described herein, the system may single instance the files using the single instancing component 135, encrypt any non-redundant files using the encryption component 137, and/or index the content of the files using the media agent 117 when creating an archive copy of the files.

Figure 1C:
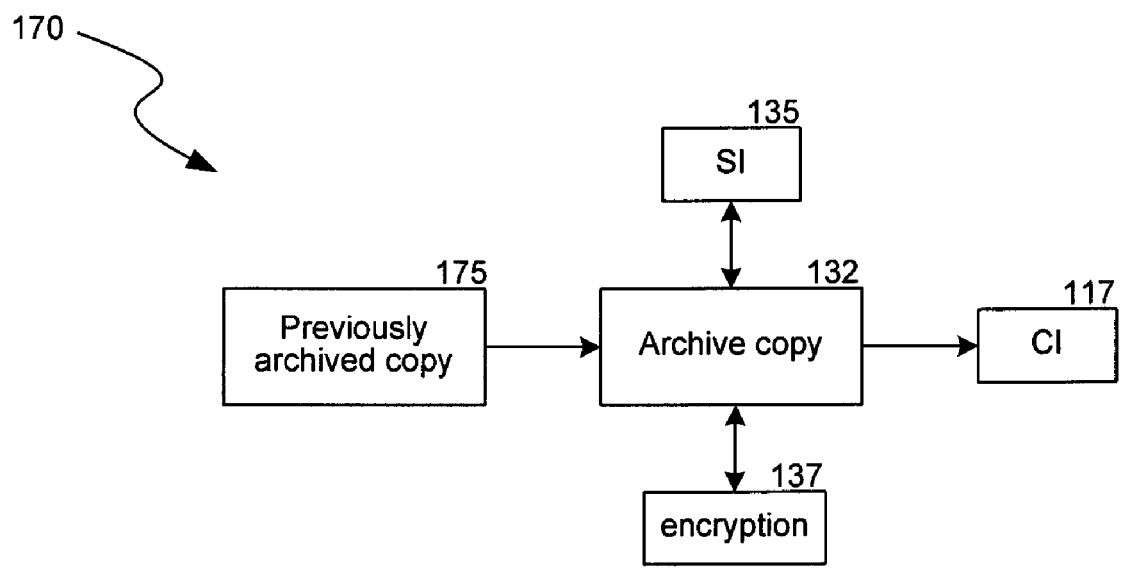
FIG. 1C is a block diagram illustrating an alternative data archival system.

In some cases, the system may create archive copies from previously stored or archived copies of data sets. Referring to FIG. 1C, a block diagram 170 illustrating an alternative data archival system that creates an archive copy from a previously archived data set is shown. For example, the system may receive a data set 175 archived by a different system and instruct the media agent 132 to archive the data set as described in the FIGS. 1A and 1B. Further details regarding examples of creating archive copies of previously archived data will be discussed below.

Examples of a Data Storage System

Figure 2A:
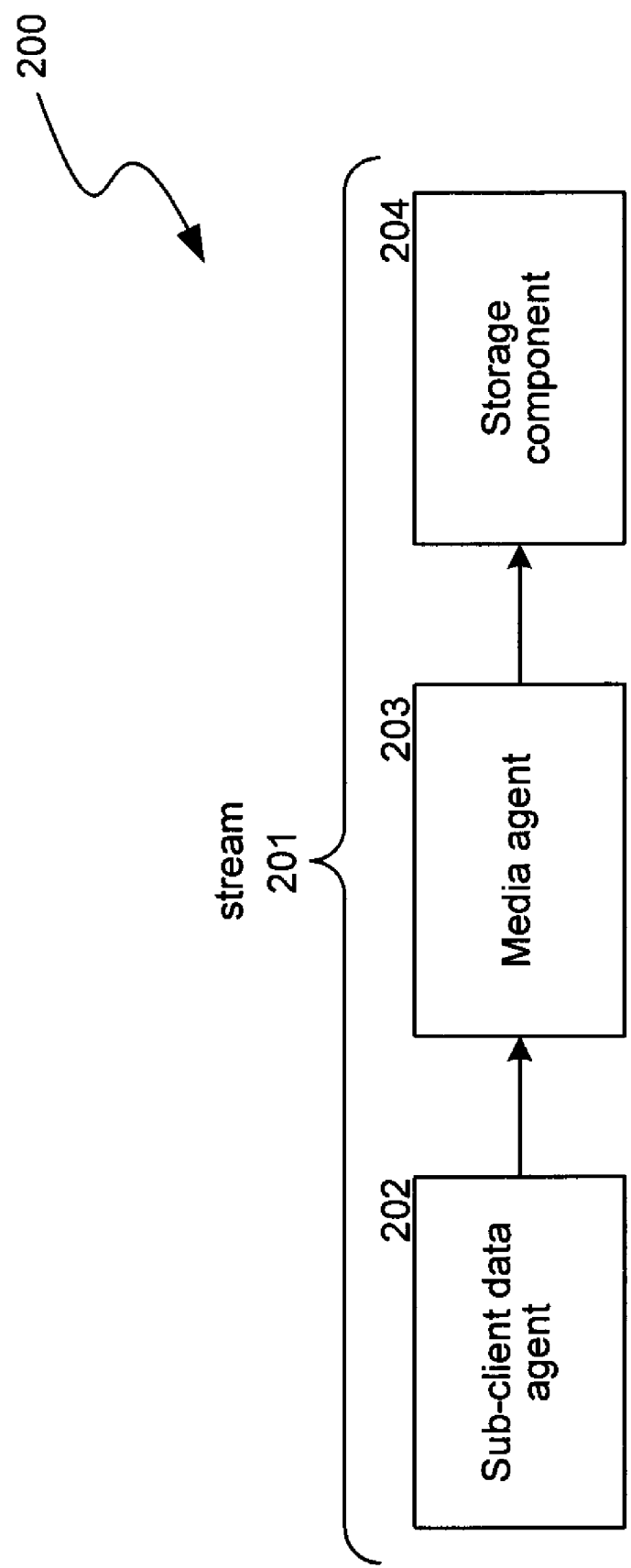
FIG. 2A is a block diagram illustrating components of a data stream.

The system described herein may collaborate with and utilize some or all data storage components of a data storage system, such as a data storage system used to create secondary copies of data such as backup copies of data, recovery copies, archive copies, and so on. Referring to FIG. 2A, a block diagram 200 illustrating components used in a data stream 201 that creates copies of data, such as archive copies, is shown. The stream 201, may include or be associated with a client 202, such as a sub-client data agent that manages and transfers data from a portion of a file system, a media agent 203, and a secondary storage device 204. For example, in storage operations, the system may store, receive and/or prepare data to be stored, copied or backed up at a server or client 202. The system may then may then refer to storage policies, schedule policies, and/retention policies (and other policies) and transfer the data to be stored to media agent 203, which then reviews the policies in order to choose a secondary storage device 204 for storage of the data. Secondary storage devices 204 may be magnetic tapes, optical disks, USB and other solid state devices, other similar media, and so on.

Figure 2B:
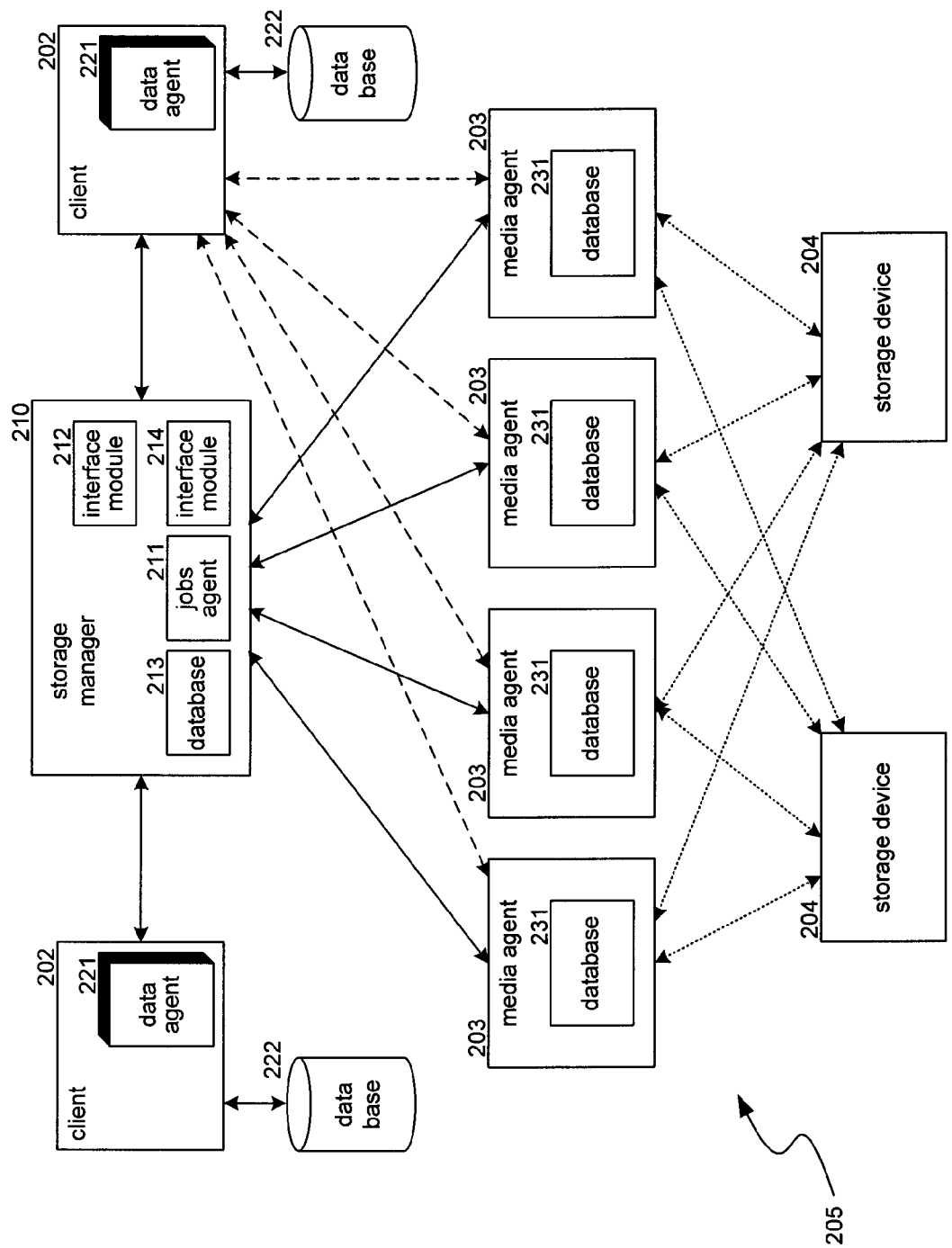
FIG. 2B is a block diagram illustrating an example of a data storage system.

Referring to FIG. 2B, a block diagram illustrating an example of a data storage system 205 is shown. Data storage systems may contain some or all of the following components, depending on the needs of the system.

For example, the data storage system 205 contains a storage manager 210, one or more clients 202, one or more media agents 203, and one or more storage devices 204. The storage manager 210 controls the media agents 203, which may be responsible for transferring data to storage devices 204. The storage manager 210 includes a jobs agent 211, a management agent 212, a database 213, and/or an interface module 214. The storage manager 210 communicates with client(s) 202. One or more clients 202 may access data to be stored by the system from database 222 via a data agent 221. The system uses media agents 203, which contain databases 231, to transfer and store data into storage devices 204 to create secondary copies of data.

The data storage system may include software and/or hardware components and modules used in data storage operations. For example, the components may be backup resources that function to backup data during backup operations or may be archiving resources employed by the system to create archive copies. Of course, the components may perform other storage operations (or storage management operations) other that operations used in data backups and/or data archiving. For example, some resources may create, store, retrieve, and/or migrate primary or secondary data copies. The secondary data copies may include snapshot copies, backup copies, HSM copies, archive copies, and so on. The resources may also perform storage management functions that may push information to higher level components, such as global management resources.

In some examples, the system performs storage operations based on storage policies, as mentioned above. For example, a storage policy is a data structure that includes a set of preferences or other criteria to be considered during storage operations. The storage policy may determine or define a storage location, a relationship between components, network pathways, accessible data pipes, retention schemes, compression or encryption requirements, preferred components, preferred storage devices or media, and so on. Storage policies may be stored in storage manager 210, or may be stored in other resources, such as a global manager, a media agent, and so on. Further details regarding storage management and resources for storage management will now be discussed.

Figure 2C:
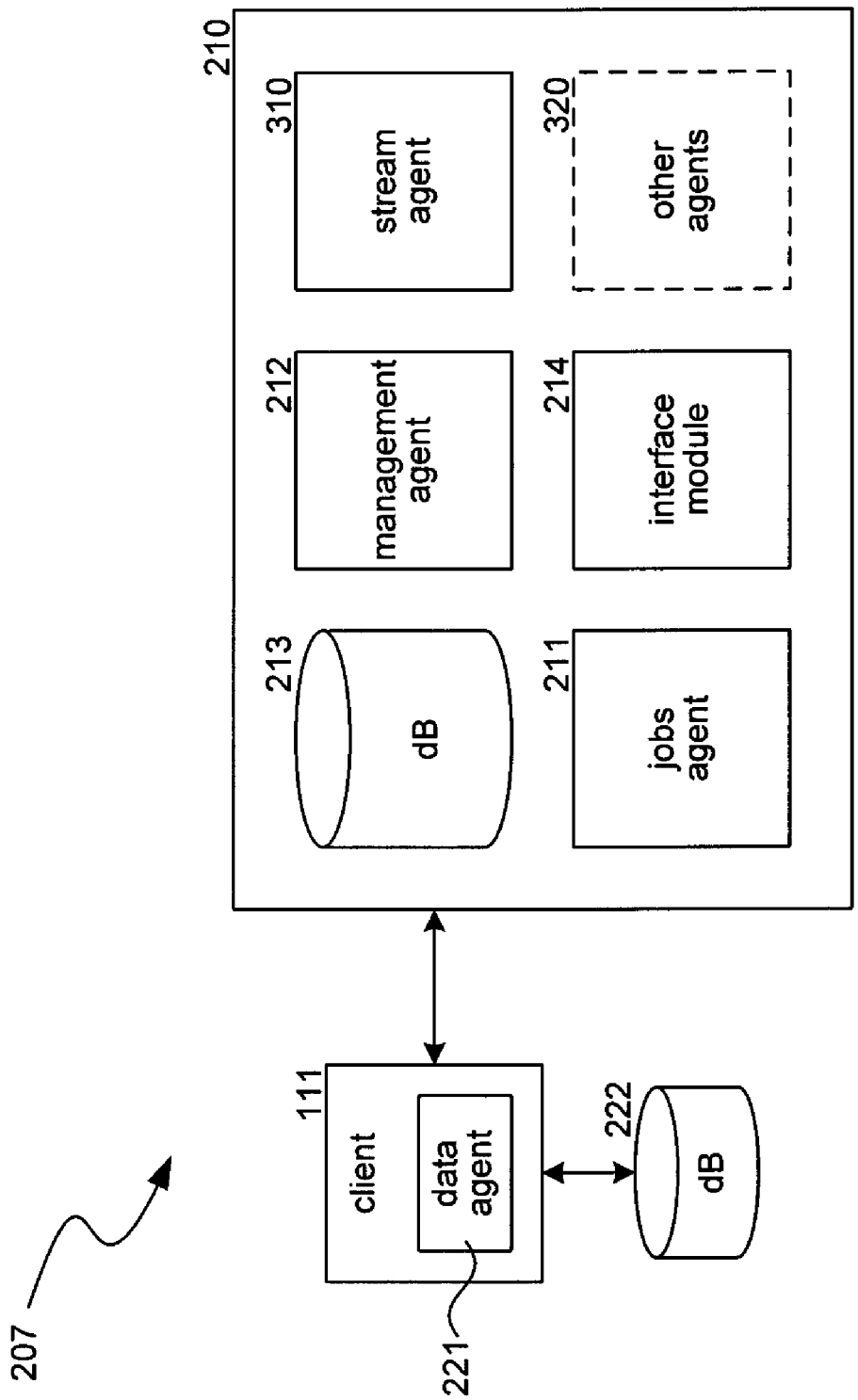
FIG. 2C is a block diagram illustrating components of server used in data storage operations.

Referring to FIG. 2C, a block diagram 207 illustrating an example of components of a server used in data storage operations is shown. A server, such as storage manager 210, may communicate with clients 202 to determine data to be copied as an archive copy or other secondary copies. As described above, the storage manager 210 may contain a jobs agent 211, a management agent 212, a database 213, and/or an interface module. Jobs agent 211 may manage and control the transfer of jobs (such as data files) from clients 202 to media agents 203. The management agent 212 may control the overall management of the data storage system, or may communicate with global managers. The database 213 may store storage policies, schedule policies, retention policies, or other information, such as historical storage statistics, storage trend statistics, and so on. The interface module 215 may interact with a user interface, enabling the system to present information to administrators and receive feedback or other input from the administrators.

Format of Archive Copies

In some examples, the system creates an archive file when creating an archive copy or other secondary copies of a data set, such as a data set originating in a file system. The creation of an archive file enables the system, when storing or restoring data, to have both a logical view and a physical view of stored data. The logical view, represented by the archive file, enables the system to store data having a format that is neutral (or, independent) with respect to data type. The physical view, represented by an index of locations on stored physical media, enables the system to locate the data stored on the physical media as chunks of the archive file.

Figure 3:
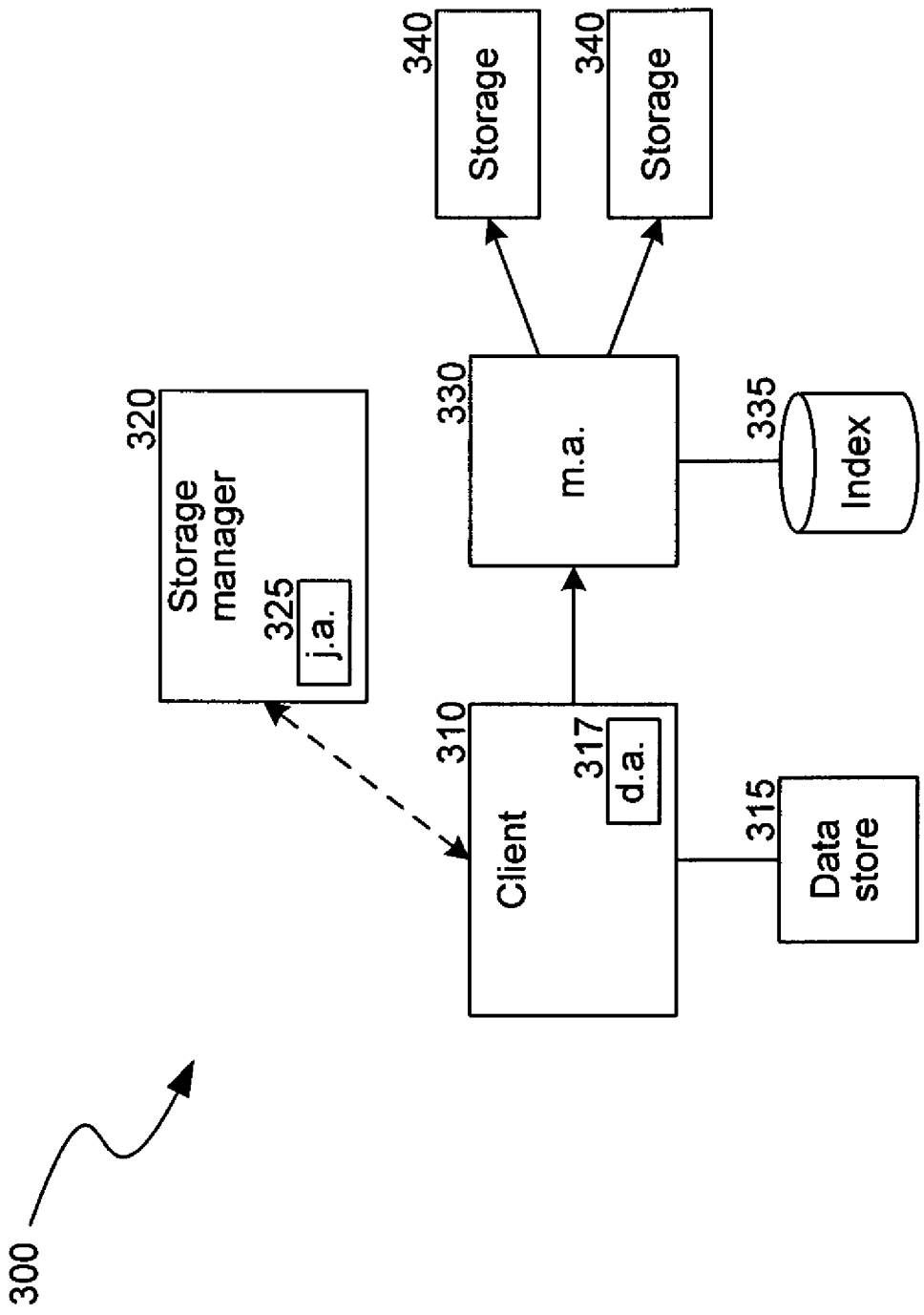
FIG. 3 is a block diagram illustrating components used to create an archive file and store an archive copy.

Referring to FIG. 3, a block diagram 300 illustrating components used to create an archive file and store an archive copy of data is shown. A client, or sub-client, 310 retrieves data from an original data store 315, such as a file system, based on instructions received from a jobs agent 325 within a storage manager 320 that controls the storage of data under management by the system. Upon receiving instructions from the jobs agent 325, the client 310, via a data agent 317, transfers data to a media agent 330 for storage into storage devices 340. The media agent 330 creates an archive file of the data, and stores a physical representation of the archive file (such as the data) as data chunks onto the storage devices 340. In creating data chunks, the media agent may divide the data into subsets that include a payload and a header, and store the subsets as data chunks. Additionally, the media agent creates or updates an index 335 for the archive file. The index 335 contains information about the content within the archive file, such as the location and size of the data chunks that relate to the archive file. Further details with respect to the architecture of the archive file are shown in FIG. 4.

Figure 4:
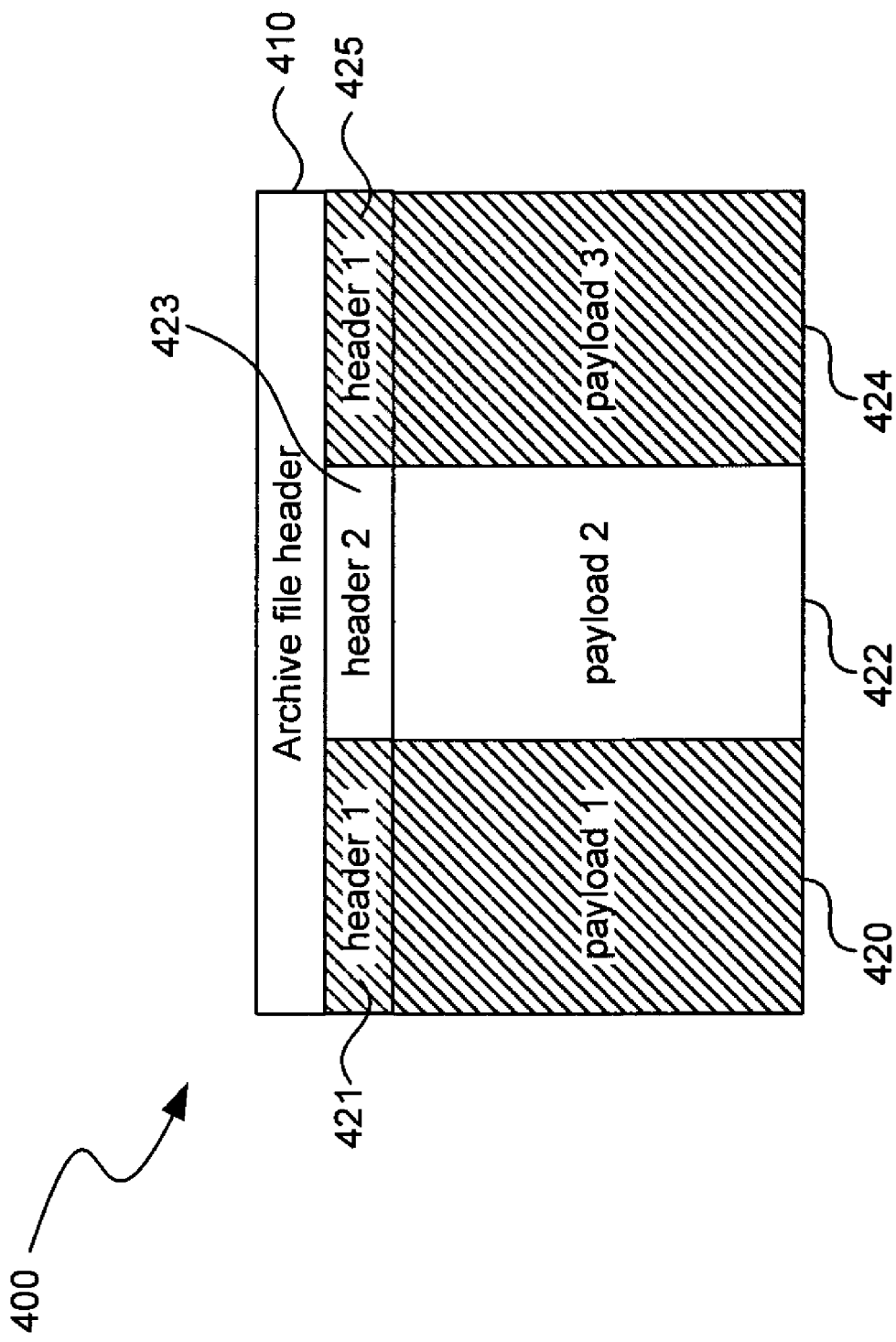
FIG. 4 is a block diagram illustrating the architecture of an archive file.

Referring to FIG. 4, a block diagram illustrating the architecture of an archive file 400 is shown. The archive file 400 includes a header 410 that contains identification information for the archive file. For example, the header 410 includes information related to where the archive file is stored (that is, what storage component, information related to where the data originated from, information related to the size of the archive file, the name of the archive file and so on). The archive file 400 also includes a first payload (data set), or chunk, 420 having a header 421, a second payload 422 having a header 423, and a third payload 424 having a header 425. Each of the payloads represents the data within a data chunk. The headers may include information that describes the type of application that created the data, the size of the payload, and so on.

In other words, when a data set is stored using a pipeline based data storage system (such as those described herein) portions of the data set are stored in pipeline buffers, or portions of memory. The archive file, therefore, relates to the data set, and the payloads each relate to a pipeline buffer. Further details regarding pipeline based data storage systems may be found in U.S. Pat. No. 6,418,478, issued Jul. 9, 2002, entitled PIPELINED HIGH SPEED DATA TRANSFER MECHANISM, which is hereby incorporated by reference in its entirety.

Referring back to FIG. 3, a media agent 330 may store the archive file 410 as a number of data chunks (e.g., chunk1, chunk2, and chunk3) onto physical storage media 340. When storing the data chunks, the media agent 330 may also update information within an index 335 that tracks the operations of the media agent 203. For example, the index 335 may include information that identifies that chunk2 was transferred at a certain time to tape 340. Further details with respect to the storage of data chunks on storage media are shown in FIG. 5.

As mentioned above, the archive file is a logical view of a data set that may include offsets within the archive file that relate to locations on physical media, such as magnetic tape) where data is stored. Referring to FIG. 5, a schematic diagram illustrating the storage of data chunks on storage components is shown. An archive file 410 may be stored on a single storage device (such as a magnetic tape) or across multiple tapes, but a data chunk generally is not stored across multiple media components. The media components 204 include data chunks, such as chunk1 of archive file 1 (520), chunk2 of archive file 1 (522), chunk3 of archive file 1 (523), chunk4 of archive file 1 (524) and chunk1 of archive file 2 (530), as well as file markers 510 located at the beginning of a new chunk. These file markers 510 may be associated with offsets within the archive file, enabling the system to locate a data chunk stored on physical media using the offsets stored within the archive file (and without knowing location information related to the physical media, such as a tape offset, a directory for a magnetic disk, and so on). Thus, the system can use the logical view of the archive file when restoring data stored as archive copies on physical media components.

Figure 5:
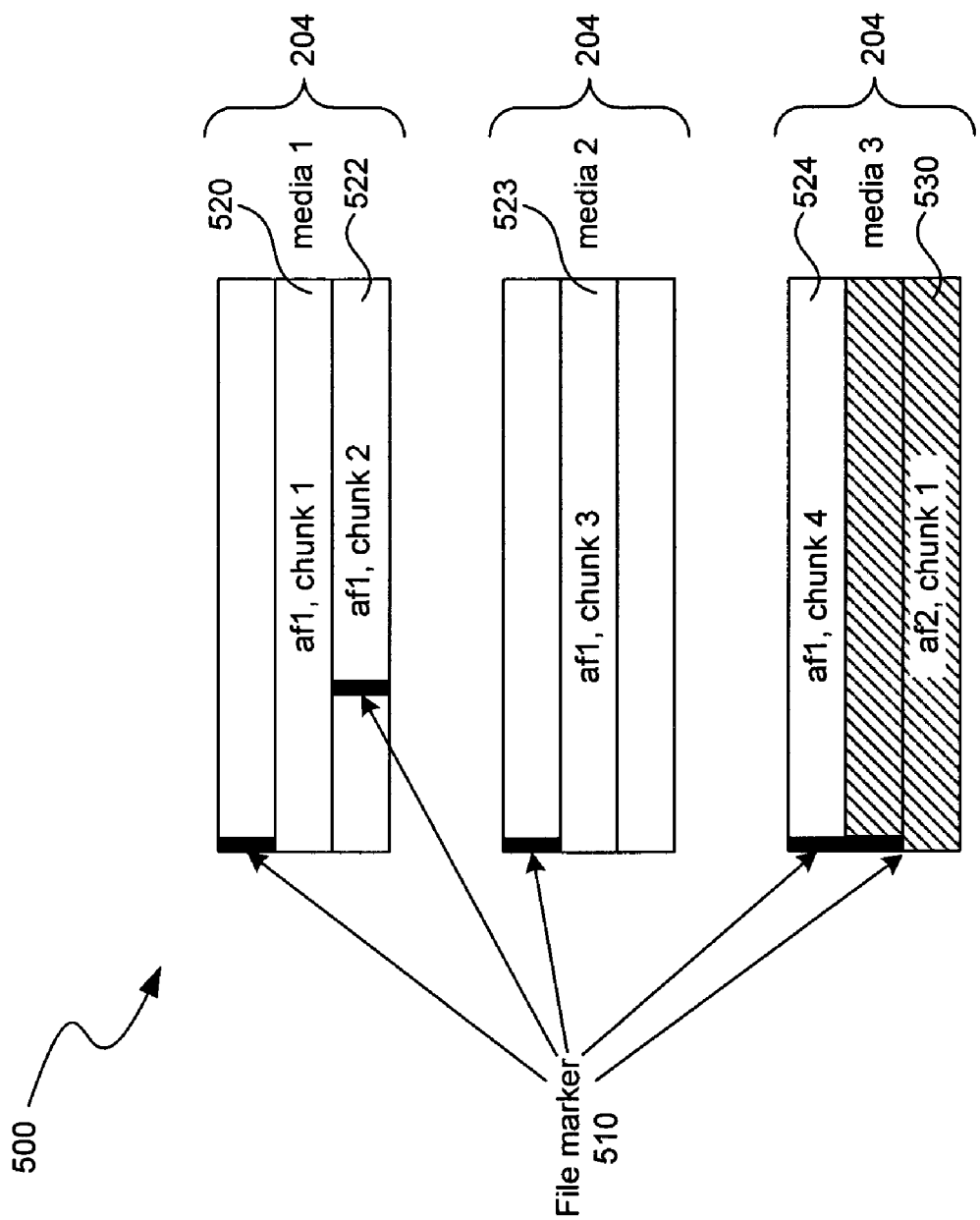
FIG. 5 is a schematic diagram illustrating the storage of data chunks on storage components.

Using FIG. 5 as an example, two different archive files are stored. The first, archive file 1 or af1, is stored with four chunks. Chunk1 (520) and chunk2 (522) are stored on media 1, chunk 3 (523) is stored on media 2, and chunk 4 (524) is stored on media 3. Archive file 2 or af2 is stored as a single chunk1 (530) on media 3. Chunks may vary in size for a variety of reasons. They may be sized based on logical increments with respect to the content of the payloads, such as at the end of a folder of files or at the end of a drive directory, and they cannot extend between media components.

File markers 510 are placed within the media to represent the beginning of a chunk and to relate back to logical offsets within the archive file 310. For example, a logical offset may identify that chunk3 of af1 is 16 GB or a certain tape counter into media 1. This can be useful when attempting to restore data. For example, when data is stored on tape, the ability to seek data to a specific byte is inefficient. However, seeking to a file marker is a quicker and easier process.

In some examples, the system may dynamically or logically determine the size and/or contents of the data chunks. For example, during single instancing a media agent may determine unique data and store all the unique data in the first chunk or first chunks of an archive file. Furthermore, the system may encapsulate the data within a chunk with header information that indicates the identification information related to the instance of the data. For example, a file within the data chunk may be encapsulated with a header or other information that includes a signature for the file based on an algorithm used to determine the uniqueness of the file within the system. This information may later enable the system to reconstruct some or all of a single instance database should the need arise. The information may include the unique signature (e.g., the hash identifier) of the data, what signature creation algorithm was used, which client transferred the data, the size of the data file, the metadata associated with the file, and so on.

The system may create two different containers of an archive file, spread across two or more data chunks. Each container may include the header information described above. The first container may include data unique to the system, such as data determined to be unique during single instancing, and may include a header that indicates the container includes unique data. The second container may include information related to the redundant data, such as pointers that represent the redundant data and point to where the first copy of the redundant data is stored.

For example, referring back to FIG. 5, the system may store all unique data for archive file af1 into chunk 1, and store all redundant data (or, pointers that represent the redundant data) into the other chunks. In this example, the system creates a first container of the data using chunk 1, and creates a second container of the data using chunks 2-4. The system may then update an index for the archive file that represents the two containers. That way, the system may be able to serve data restore and other discovery type requests more quickly and/or efficiently by only searching the chunk that contains the unique data. Additionally, the system may be able to improve the capacity of physical storage by adding information that indicated when a container should not be deleted (e.g., when a container includes data or a pointer to data that is under management by the system) and when a container may be deleted (e.g., when a container includes pointers that refer to data that has since been removed from the system).

Thus, creating archive copies in an archive file format enables the system to establish a logical view of archived data. The logical view is neutral to file types, and can therefore be used to restore data using any components within a system, not just components that rely on file types to restore data. In effect, using the archive file format, the system may be implemented using any different types of hardware components because the media agents that store the data maintain the data in the archive file format.

For example, because the format is type and hardware component independent, the system can single instance data sets across heterogeneous storage media. For example, the system can single instance data across different storage media (tapes, disks, and so on) or file systems (windows, UNIX, and so on). The system can then create archive copies of data without data redundancies using heterogeneous media. Additionally, the system can then restore and provide data to users across heterogeneous systems, because the system does not depend on the applications or file systems that created the data. For example, data originally created in a UNIX environment may be stored as an archive file that is independent of typical UNIX data types. Years later, the system may receive a request to recover this data from a device operating a Windows based device. Being data type independent, the systems is able to retrieve the file (in the archive file format), and recreate the file as a Windows based file for recovery within the Windows environment. Similarly, the system can also recover files created by different environment versions (such as recovering a Windows 95 file for a Window 2003 system).

Creating Archive Copies of Data

Figure 6:
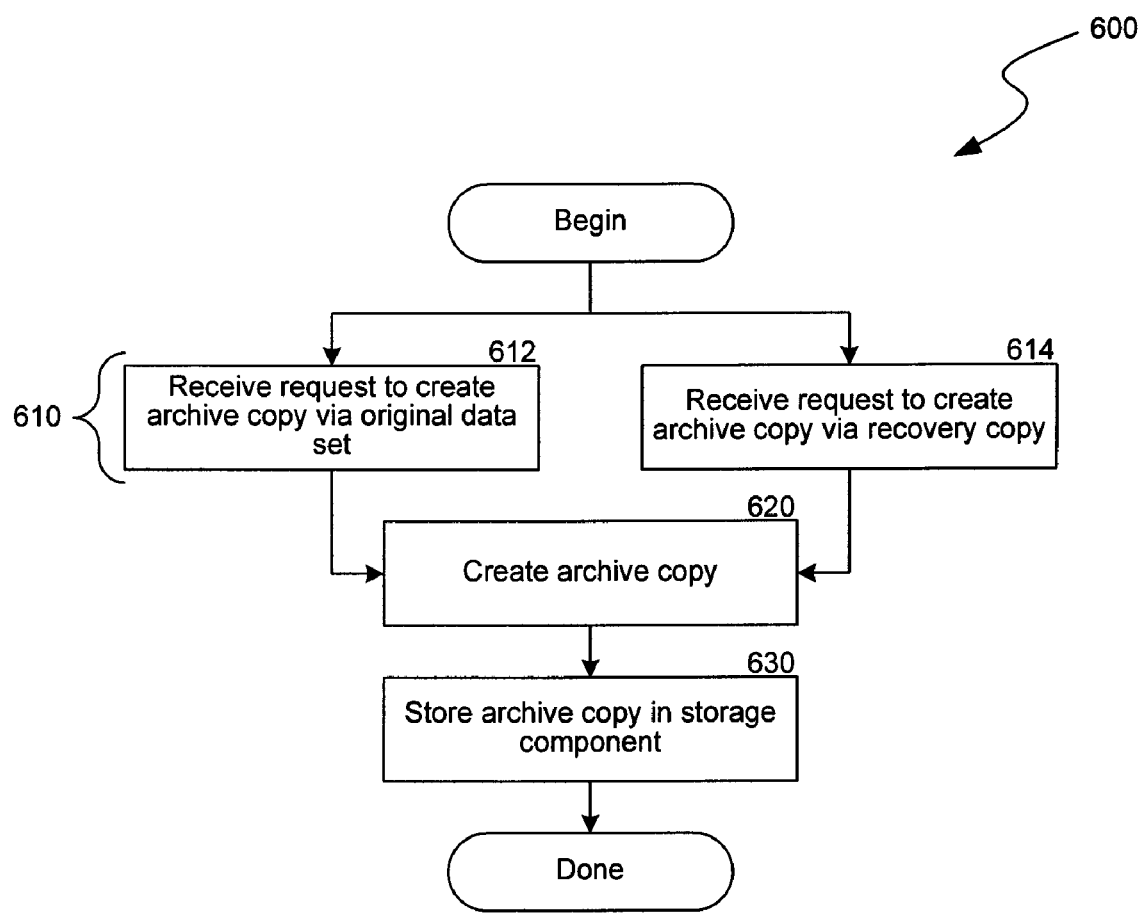
FIG. 6 is a flow diagram illustrating an exemplary routine for copying data.

Referring to FIG. 6, a flow diagram illustrating an exemplary routine 600 for copying data is shown. FIG. 6 and other flow diagrams described herein do not show all functions or exchanges of data, but instead they provide an understanding of commands and data exchanged under the system. Those skilled in the relevant art will recognize that some functions or exchanges of commands and data may be repeated, varied, omitted, or supplemented, and other aspects not shown may be readily implemented.

In step 610, the system, such as system 100, receives a request to create an archive copy of a data set. For example, the system may receive the request to create a copy from an original data set, or primary copy (step 612) or from a recovery copy or other secondary copy (step 614). In some cases, the system may receive a request to create an archive copy from data both types of copies. In step 620, the system creates an archive copy, such as by using the data storage components described herein. In some cases when the data of the recovery copy is in the same form and state as the original data (or in a similar form), the system may not need to copy the data directly from the file system. Instead, the system may utilize the recovery copy to build and create an authentic and reliable archive copy of the original data. Additionally, the system may modify, reduce or remove data, may encrypt data, may index data, or may perform other processes to the data in creating the archive copy, as described herein. In some cases, the system performs some or all of these processes in order to create an archive copy that is different than other secondary copies (e.g., the recovery copy), because the archive copy may serve other needs for the system. For example, the system may single instance and encrypt all collected data under management when creating an archive copy. In step 630, the system stores the archive copy to a storage component. That is, the system generally performs additional or different storage techniques (such as single instancing, encrypting, and so on) when creating an archive copy of data than when creating other secondary copies, unlike other systems that merely transfer secondary copies, such as recovery copies, to long term storage resources when building an archive of data.

For example, the system receives a request from a user to create an archive copy of all emails sent on Nov. 14, 2007. The system, in step 610, receives the request via a user interface that allows the user to quickly select data to be copied as an archive copy. The system generates an archive file for the data to be archived, and stores a number of chunks to a magnetic tape that relate to the archive file. Additionally, the system may perform a number of processing techniques in creating the archive copy that the system may not perform when creating a recovery copy, a backup copy, and so on.

Figure 7:
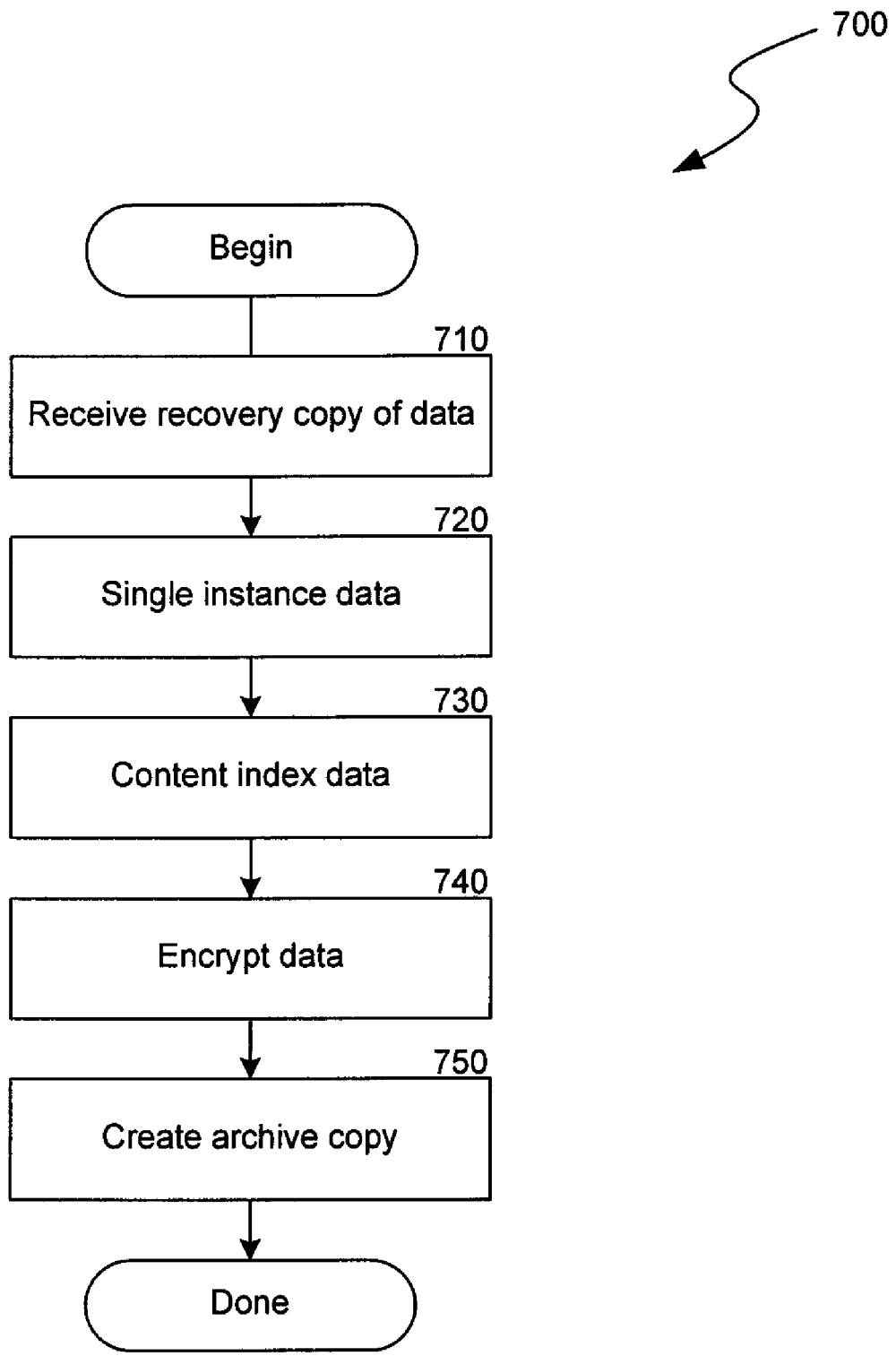
FIG. 7 is a flow diagram illustrating an exemplary routine for creating an archive copy of data.

Referring to FIG. 7, a flow diagram illustrating an exemplary routine 300 for creating an archive copy of data is shown. In step 710, the system receives the recovery copy of an original data set from a file system. Alternatively, the system may access the recovery copy or otherwise communicate with data storage components in a data storage system to gain access to the data. For example, a data store containing the recovery copy and the archive component may be at an offsite or remote location from the file system, and may perform some or all processes at the remote location and not at the location of the file system.

Figure 8:
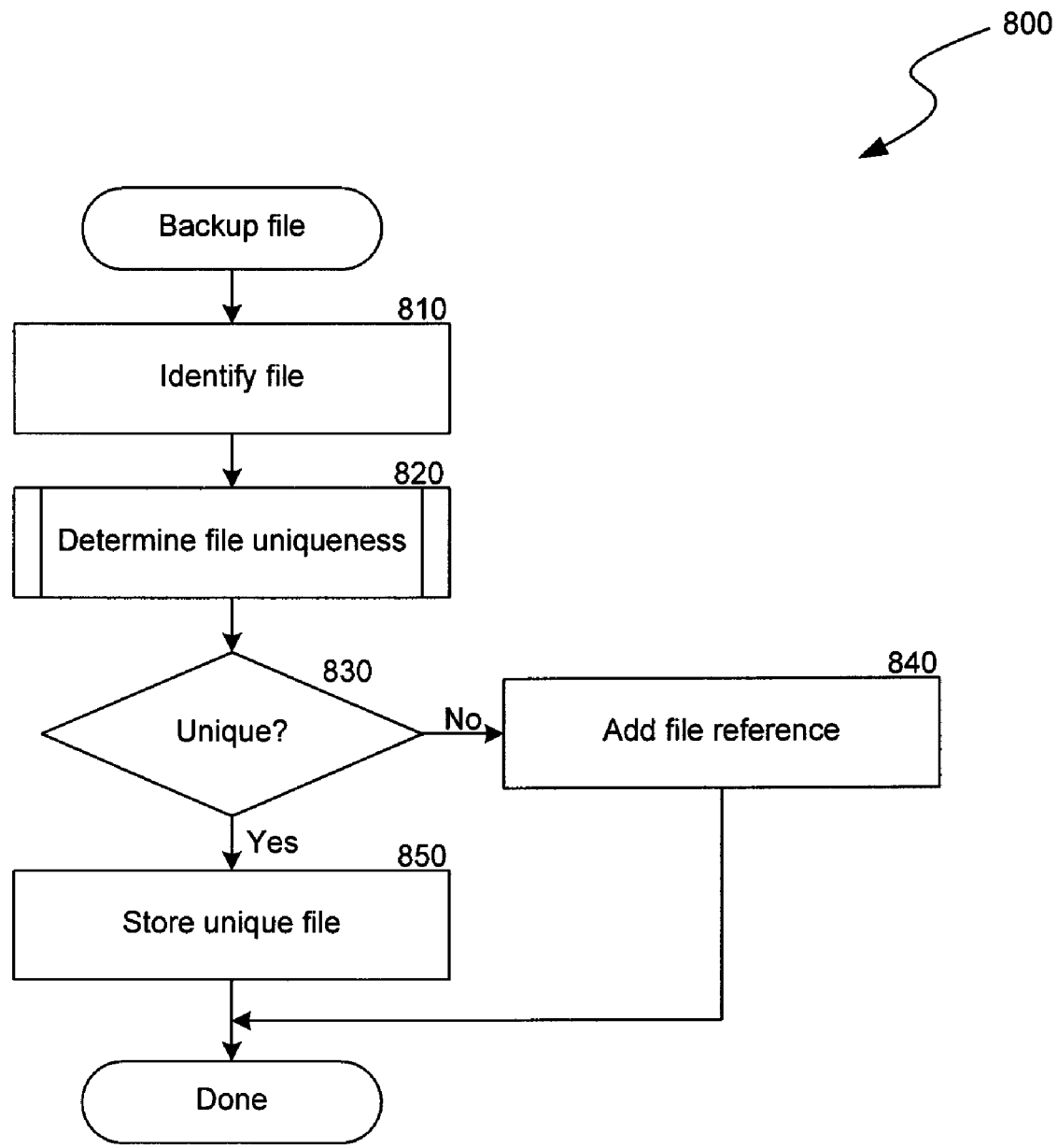
FIG. 8 is a flow diagram illustrating an exemplary routine for reducing a data set to single instances of data.

In step 720, the system may only transfer a single instance of any redundant data instances. For example, the system may reduce the data set to be transferred by removing duplicate instances of data files and other information. Referring to FIG. 8, a flow diagram illustrating an exemplary routine 800 for reducing a data set to single instances of data is shown. As data is transferred, such as a file, the system may look to a storage operation component, such as component 135, to eliminate any redundancies. For example, in step 810, the system identifies a file to transfer to the archive copy. In step 820, the system determines in the file is unique to the data set or if the file has been already stored. For example, the system may create a unique identifier, such as a hash or digest of a file, and compare the hash or digest with other created hashes/digests to determine the uniqueness of the file. In decision block 830, if the file is unique, routine 800 proceeds to step 850 and stores the file in the archive copy, else routine 800 proceeds to step 840 and adds a reference about the file to the already stored file that indicates a redundancy of the file. For example, the system may store data determined to be unique in a first container and store pointers related to data determined to be redundant in a second container as chunks within the archive copy. Further details about creating archive copies with unique data files may be found in commonly assigned U.S. Provisional Patent Application No. 60/871,737, filed on Dec. 22, 2006, entitled SYSTEM AND METHOD FOR STORING REDUNDANT INFORMATION.

The system may utilize a tiered system when single instancing data sets to be stored as an archive copy. For example, the system may access data that is more readily available for copying (such as data stored on hard disks or within the file system) and begin single instancing using that data.

Figure 9:
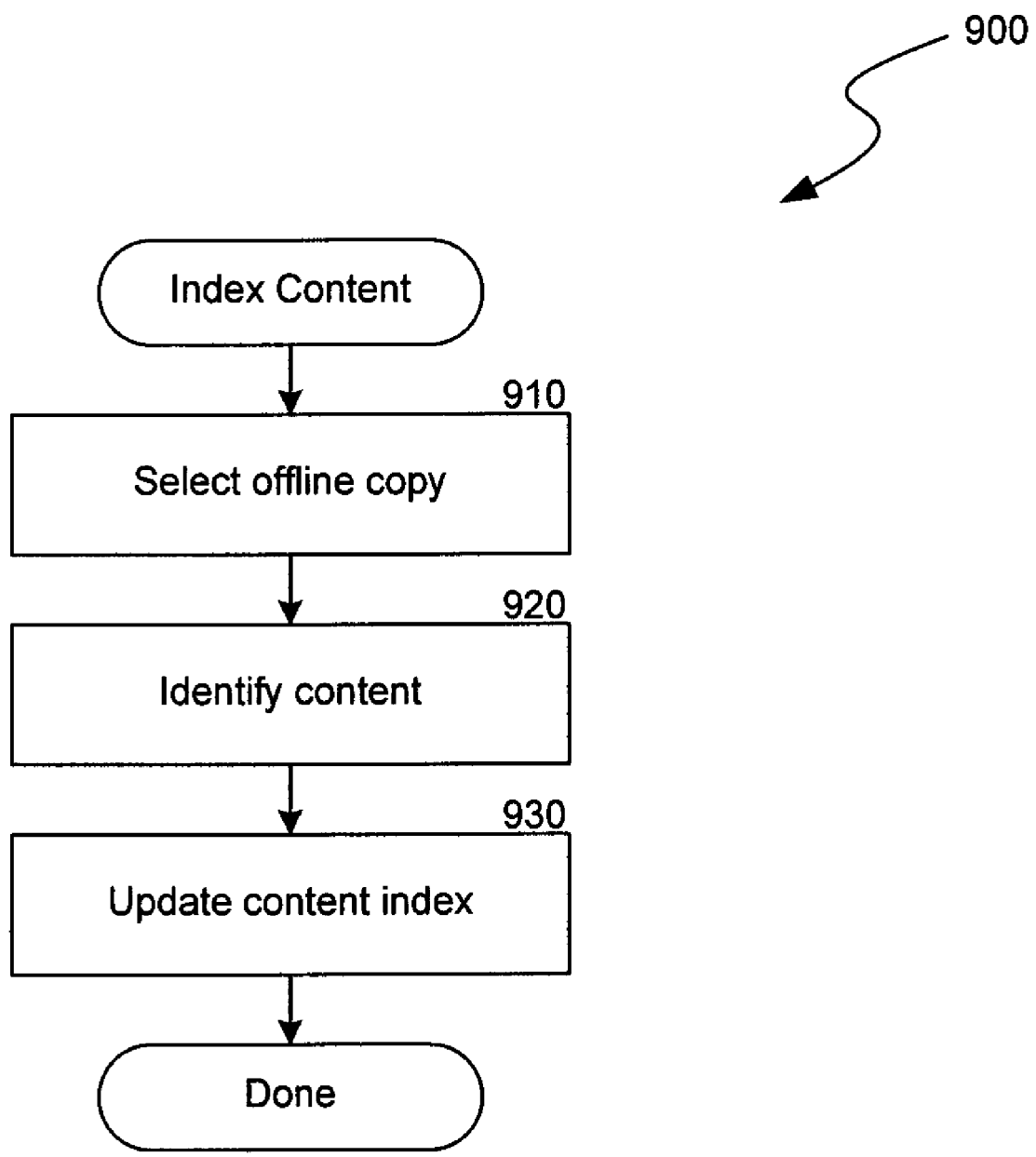
FIG. 9 is a flow diagram illustrating an exemplary routine for indexing an archive copy of a data set.

Referring back to FIG. 7, in step 730, the system may index the data stored in the archive copy. For example, the system may index the content of the data. Referring to FIG. 9, a flow diagram illustrating an exemplary routine 900 for indexing a data set is shown. In step 910, the system, via a content indexing component such as component 140, selects data to be indexed, such as data stored or being stored in the archive copy. In step 920, the system identifies content in the data to be indexed. For example, the system may identify data files such as word processing documents, spreadsheets, powerpoint presentations, metadata, and so on. The system may check the data against previously indexed data, and only index new or additional data. In step 930, the system updates the index with the identified content to make the identified content available for searching. The system may parse, process, and store the data. For example, the system may add information such as the location of the content, keywords found in the content, and so on. The system may index the content before performing other processing to the data, such as encryption, single instancing, and so on. Further details about indexing content may be found in commonly assigned U.S. patent application Ser. No. 11/694,869, filed on Mar. 30, 2007, entitled METHOD AND SYSTEM FOR OFFLINE INDEXING OF CONTENT AND CLASSIFYING STORED DATA.

Referring back to FIG. 7, in step 740, the system may encrypt the data before or after the archive copy is created. For example, the system may employ many different techniques for encrypting the archive copy. Further details about encryption and encrypting archive copies of data may be found in commonly assigned U.S. Provisional Patent Application No. 60/882,883, filed on Dec. 29, 2006, entitled SYSTEM AND METHOD FOR ENCRYPTING DATA TO BE ARCHIVED and commonly assigned U.S. Provisional Patent Application No. 61/001,485, filed on Oct. 31, 2007, entitled SYSTEM AND METHOD FOR ENCRYPTING DATA TO BE ARCHIVED.

Figure 10:
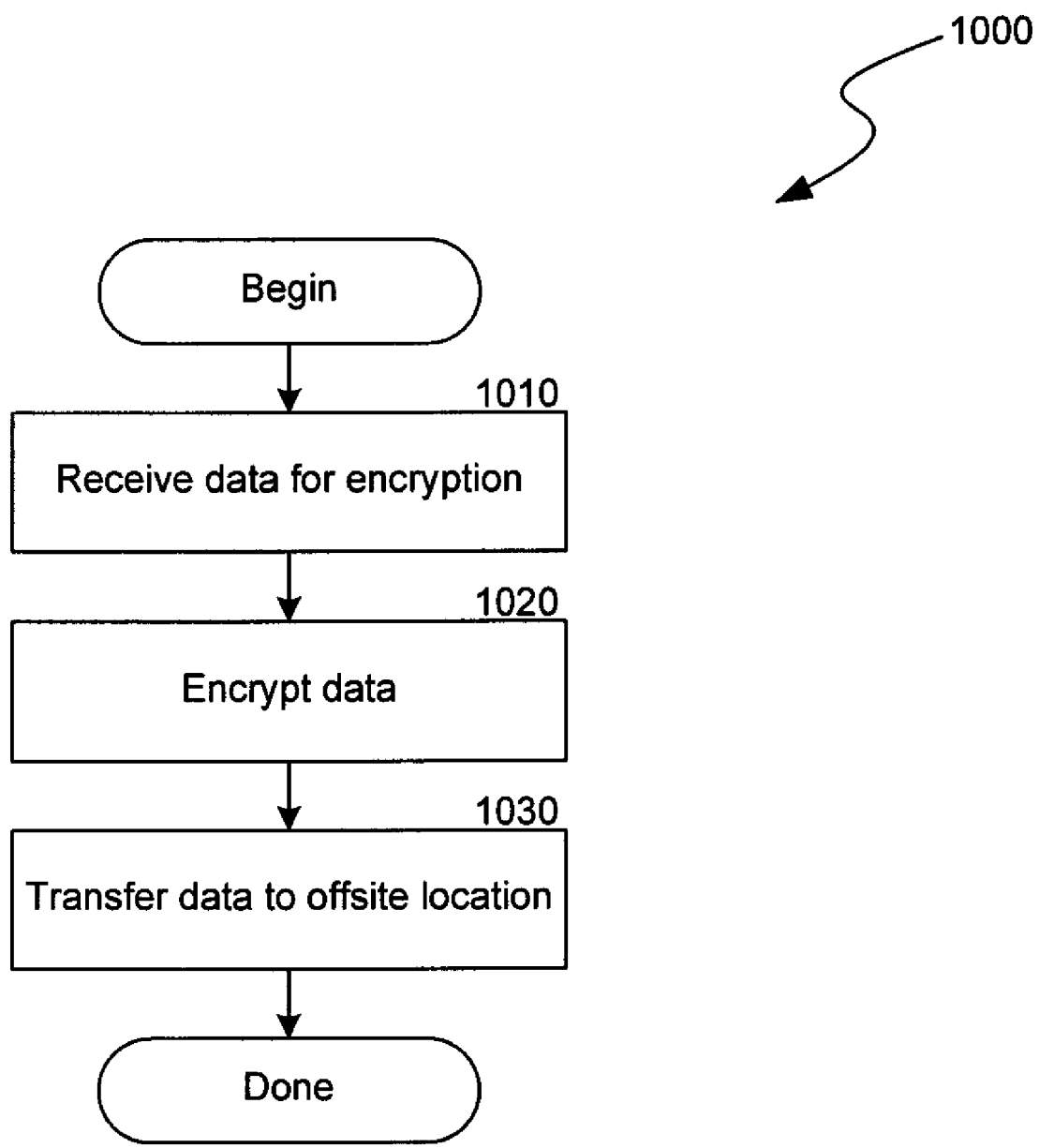
FIG. 10 is a flow diagram illustrating an exemplary routine for encrypting an archive copy of a data set.

Referring to FIG. 10, a flow diagram illustrating an exemplary routine 1000 for encrypting an archive copy of a data set. In step 1010, the system receives data to be encrypted. For example, the system may receive the data from the recovery copy, after the data set is indexed and reduced. In step 1020, the system encrypts the data using encryption techniques described herein. In step 1030, the system optionally sends the encrypted data set to the archive location, such as to a media component stored in a offsite storage facility.

In some cases, the system may hash the data or otherwise single instance the data and then encrypt the data, as discussed herein. For example, the system may calculate a hash value for all data of a data set to be archived. The system may then create a table, index or database of the calculated hash values that represents the native data of the data set. The system may then encrypt the native data and create a database that includes information related to the locations of the encrypted data. Thus, the system creates two databases for an archive copy of data, a first database that contains information regarding the location of the archived data and a second database that contains the hash values for the data. This enables the system to restore the data even when the database identifying the locations of the data is lost or corrupted. Additionally, the format of the archive file may enable the system to restore the single instancing database, should the need arise. For example, data objects within chunks are encapsulated with tag headers that include single instancing information, such as a hash value. For additional security, the system may scramble the hash database or encrypt the hash database to prevent unwanted users from easily retrieving its contents.

The system may employ a number of hashing techniques when calculating hash values for a set of data. For example, the system may employ SHA (secure hash algorithms) functions, such as the SHA-1, the SHA-2 (which includes SHA-512), and contemplates uses of the recently announced SHA-3 function. The system may use other hashing functions, such as MD5.

Referring back to FIG. 7, in step 350, the system creates the archive copy of the data set. The system may then store the archive copy in archive file format by storing data chunks onto physical media.

Using a Tiered Storage Policy to Create an Archive Copy

Figure 11:
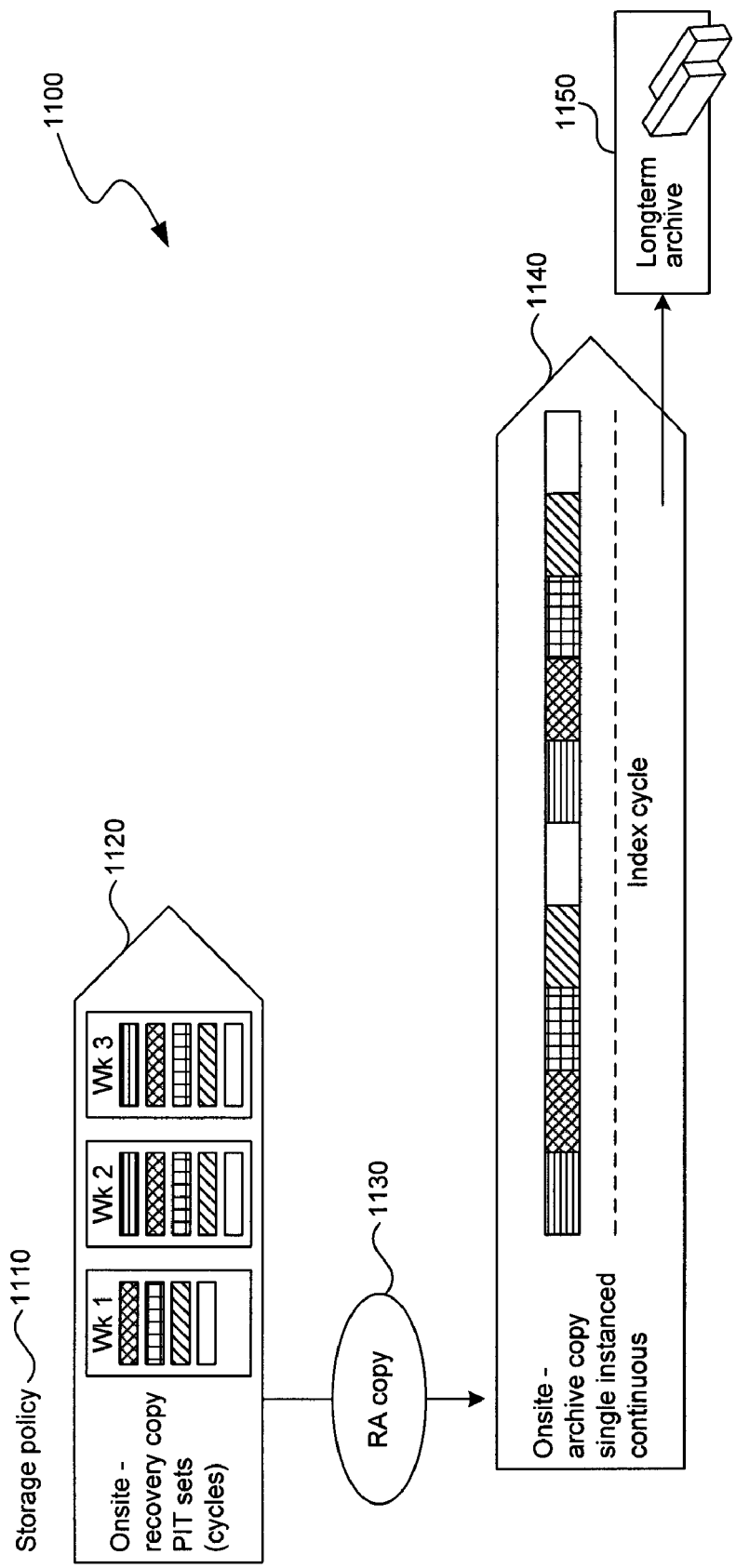
FIG. 11 is a block diagram illustrating a storage policy for creating a data archive for an existing archived data set.

Referring to FIG. 11, a block diagram illustrating a data archiving system 1100 for a data set is shown. The system may implement a storage policy 1110 that defines where to copy the data. For example, the storage policy may be a tiered storage policy, containing a copy layer that transfers data to a recovery copy 1120 and a copy layer that transfers data to an archive component 1130 that creates an archive copy 1140 using the processes described herein. The storage policy 1110 may define that the archive copy 1140 is to be stored in as a longtime storage copy 1150, such as an archive copy. Thus, the system may include a system 1100 having a storage policy that creates one or more secondary copies of data from a primary copy of the data, with one of the copies being an archive copy that is processed with respect to the other secondary copies.

The storage policy 1110 may also define any processes the system is to perform on the data before or after creating the archive copy 1140. For example, the storage policy 1110 may indicate to the system to perform indexing of the content of the data, to perform the removal of redundant data, to encrypt the data, to erase data not needed for retention, and so on.

Using a tiered storage policy, the system creates the archive copy 1140 while it creates other secondary copies 1120. In some cases, creating both types of copies using one storage policy may utilize more or additional data storage system resources than needed in only creating a recovery copy. However, because the system performs some, if not all, copying outside of the file system, the system generally does not impact the source (or its resources) of the original data set. Thus, the system is able to create the archive copy 1140 and recovery copy 1120 without applying additional resource constraints on a source. Furthermore, creating an archive data set when creating the recovery copy allows the system to compress the archive data, to reduce gaps in data, and supports data retrieval and discovery by providing a searchable index of the content of the archived data. Additionally, the system eliminates some or all redundant data files, reducing the amounts of data to be stored and possibly recovered at a later time.

Archiving Existing Archived Data Sets

In some cases, the system may be applied to existing archived data sets. For example, some archived data sets are nothing more than many boxes of magnetic tapes storing data. These tapes often contain redundant data that may take up more than half of the entire archive. Thus, in some cases, it may be beneficial to apply the archiving methods and system described herein to existing archives in order to provide the existing archives with indexing and data reduction (and other benefits), reducing storage costs and providing acceptable recovery times. As described herein, the system can create a copy of data (such as an archive copy) that is independent of the system that created the data, applications that created the data, and so on. The system can therefore receive data from various heterogeneous sources and create a single independent copy of data that may be used as a long term copy of the data.

Figure 12:
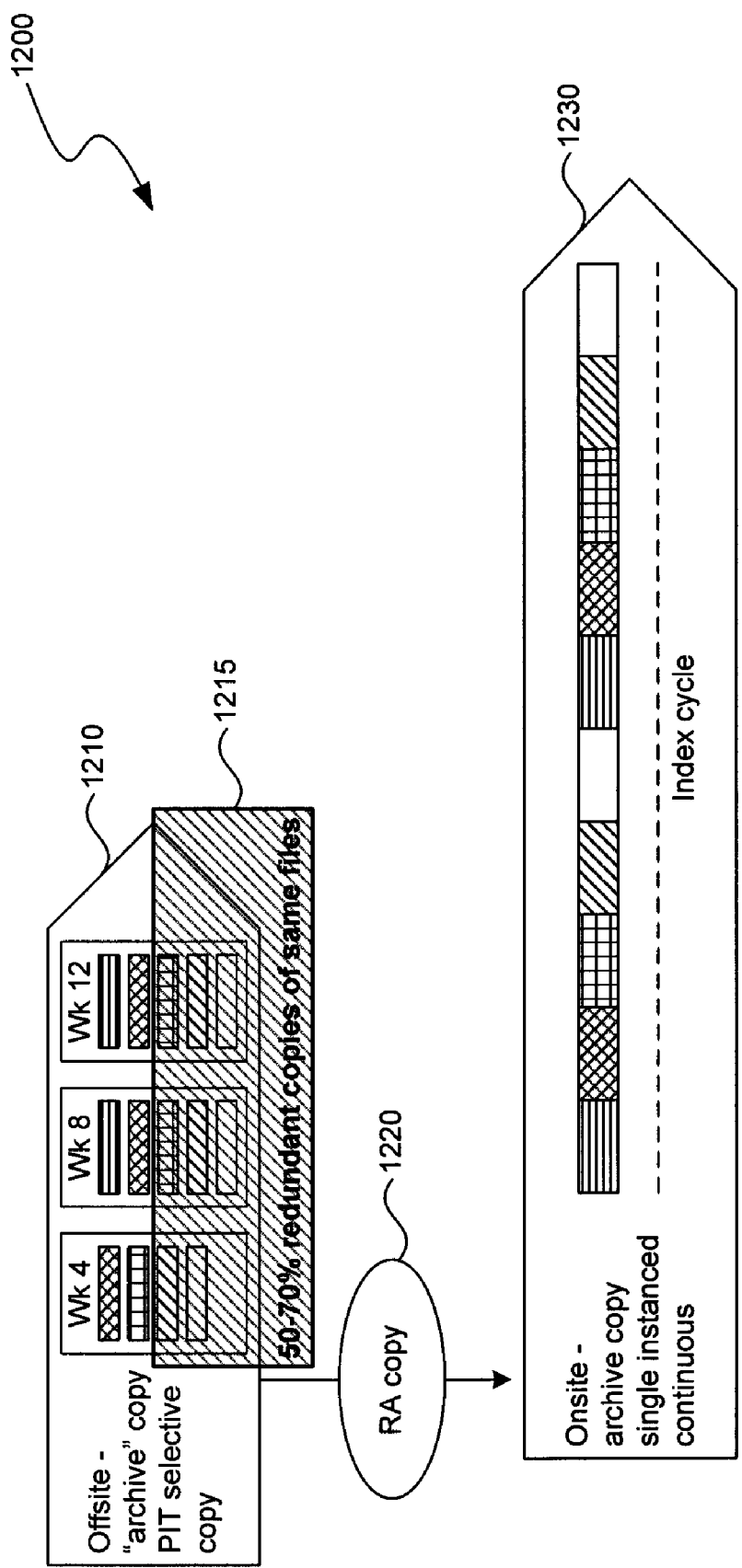
FIG. 12 is a block diagram illustrating an alternative data archive and retrieval system.

Referring to FIG. 12, a block diagram illustrating an alternative data archive and retrieval system 1200 is shown. The system 1200 may access an existing data archive 1210, such as an archive 1210 containing many redundant instances of data files 1215. The system may perform a copy of the data in the archive 1210 via a copy component 1220, and may create an archive copy 1230, as described herein.

Figure 13:
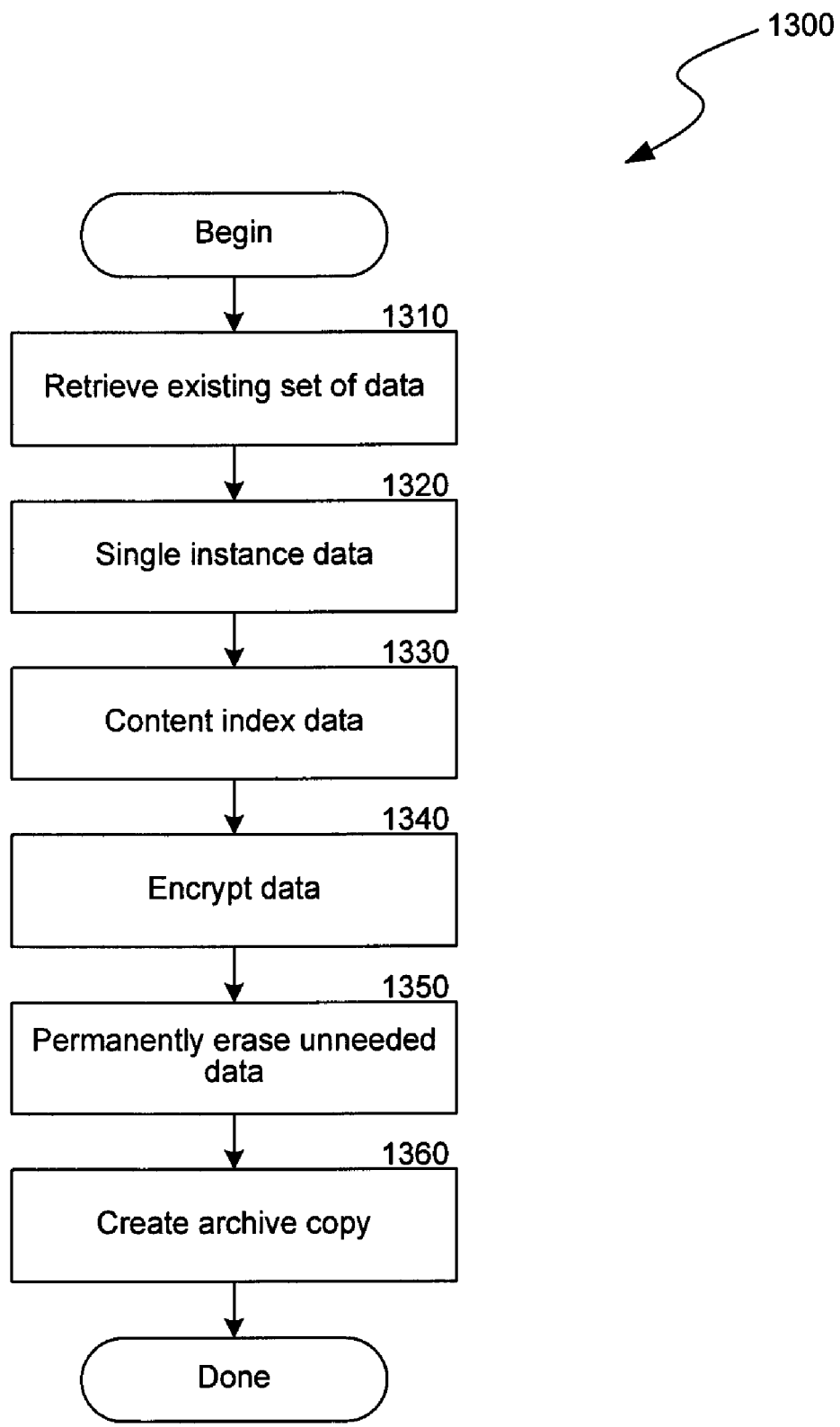
FIG. 13 is a flow diagram illustrating an exemplary routine creating an archive copy of data from an archived data set.

Referring to FIG. 13, a flow diagram illustrating an exemplary routine 1300 creating an archive copy of data from an existing archived data set is shown. In step 1310, the system retrieves or otherwise accesses an existing archived data set. For example, the system may recall tapes of an archive, move the tapes to a data library of a data storage system, and access the tapes to read the data and create the archive copy. In step 1320, the system may single instance the data, removing the redundant data instances before storing the data in the archive copy. In step 1330, the system may index the data, such as the content of the data, to enable users or administrators to search and easily retrieve content from the data. For example, indexing previous archived data may ease the burden of discovering certain data or files in the archived data. In step 1340, the system may encrypt or otherwise protect the data or the archive. In step 1350, the system may permanently erase any data from the previously archived data set no longer needed, further reducing the size of the created archive copy. In step 1360, the system creates the new archive copy from the existing archived data.

In some cases, the system may reduce data gaps that can occur in typical data storage systems. These systems may archive data by sending recovery copies to a data archive on, for example, a monthly basis. However, often, data will undergo many changes and modifications within a month. Thus, the data storage system may only store the modifications present at the monthly increments, causing gaps in the archived data set.

The system reduces such data gaps by creating the archive copy when the system creates the recovery copy. For example, the system using single instancing and other redundancy techniques may periodically or constantly create an archive copy of an original data set, storing original data and any incremental changes to the data. Thus, the system is able to catch and archive the incremental changes and continually build an archive copy for data under management of an organization.

The system provides an indexed, continuous archive copy of data under management containing little or no redundancy without taxing the systems at the data source, among other benefits.

Collaborative Search System

Additionally, the system provides many benefits in data retrieval, collaborative search, and discovery. For example, in a discovery request certain emails are to be found. Typical archived systems, storing data in boxes of tapes and other media, may need to check each and every tape in order to discover the required email. Using the archive copy techniques described herein, the system may quickly and easily satisfy the request. For example, in creating the archive copy, the system reduces redundant files and indexes the content of the files. Thus, when a user of the system provides search information for the certain emails (such as a sender's name or keywords in the body of the email), the system may easily search the content of the archive using the index. Furthermore, because the system may eliminate all multiple instances of data, users may feel a high level of comfort in knowing that the search of content will find each and every file requested. Further details will now be discussed.

The system described herein provides a unified approach to data management that enables legal and IT groups to focus management and discovery efforts on a single data repository, eliminating the need to search and preserve information in both backup and archiving applications. This capability provides IT with the tools to initiate an effective legal hold—the ability to lock down electronically stored information—in response to anticipated litigation. The system may support legal hold on a wide range of compliance media including NetApp SnapLock, HDS DRI and HCAP, Archivas, EMC Centera, Pillar Data, and Permabit, as well as a host of WORM media—tape, UDO Magneto/Optical and PPD. The system enables users to archive, backup, and replicate data within a common infrastructure, creating a single repository for the majority of an organization's discoverable data, including e-mail, files, backups, archives, SharePoint documents, and databases. The system benefits users with support for FRCP preparedness, including:

Legal Hold Support: The system enables users to respond to anticipated legal action by collecting and optionally content-indexing relevant active and online data in a user's mailbox or files and placing it on legal hold. This is done with the system's standard, fast, reliable method for protecting, securing and indexing mailboxes and files.

Data Archiving: The system archives data using real-time collection from the Exchange Journal and other applications, and allows for the scheduled collection of both e-mail and files based on variety of metadata parameters. Examples of metadata parameters include an owner, a last modified time, a size, an application that generated the selected program data, a user that generated the selected program data, header information, a creation date, a file type, a last accessed time, an application type, a location, a frequency of change, a business unit, usage trends associated with the selected program data, aging information, and so on. These capabilities, combined with content indexing, give organizations more options to organize and retain business records.

Media Management: The system provides native media management that includes a robust mechanism to logically manage a corporation's data. The system tracks the location of removable media, manages library slots for easy media access, prompts for media rotation to ensure compliance with policies, manages foreign tapes, tracks by container and shelf, and automates the rotation of media back on-site for reuse and retirement.

Audit-ready Reporting: The system also provides audit-ready reporting of both successes and failures to enable IT teams to answer questions during pre-trial conferences.

In some examples, the system provides integration with NetApp SnapLock and other storage management applications. The system's ability to place relevant information on Legal Hold in conjunction with NetApp SnapLock on any NetApp storage system provides a high level of data protection and flexibility to suit e-discovery initiatives. The system's unified approach to data management differentiates its e-discovery options by providing users with consistent search and discovery capability across data under management by the system, such as secondary copies of data. Through certification programs and partnerships with leading OEMs, enterprises can respond quickly and effectively to recently-announced FRCP amendments, preparing their IT operations to properly support discovery and legal hold requests.

Figure 14:
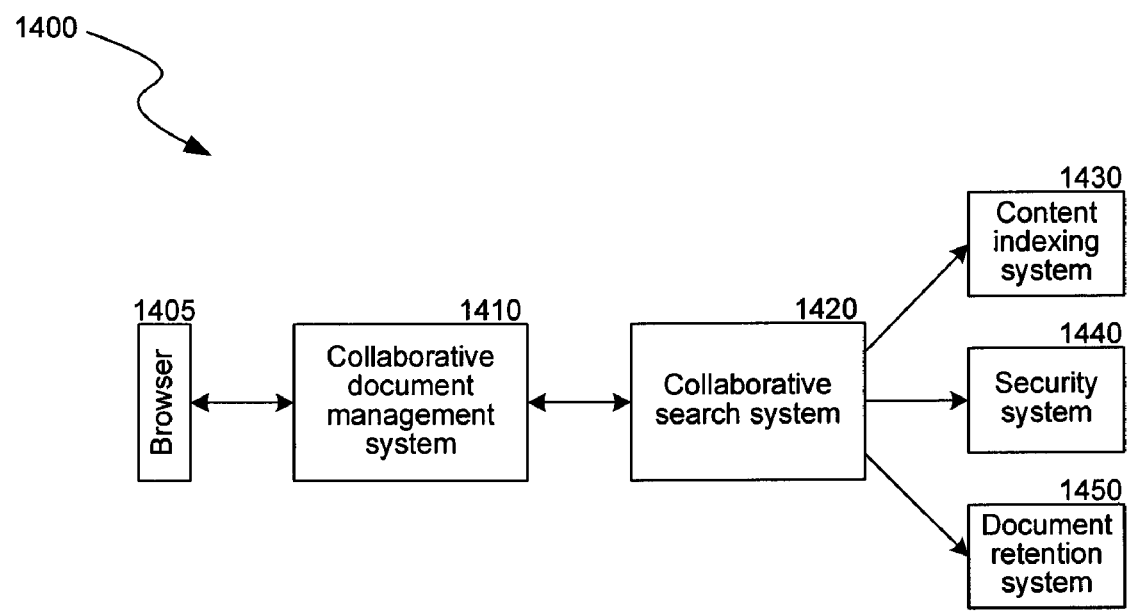
FIG. 14 is a block diagram illustrating an example architecture for integrating a collaborative search system with a collaborative document management system.

Referring to FIG. 14, a block diagram 1400 illustrating an architecture for integrating the collaborative search system with a collaborative document management system is shown. A browser 1405 is used by collaborative participants to access the integrated system. A collaborative participant submits queries, receives results, and performs other collaborative tasks through the browser 1405. The browser 1405 is connected to the collaborative document management system 1410, such as Microsoft Sharepoint Server. The collaborative document management system 1410 provides a web-based portal for collaboration between collaborative participants. The collaborative document management system 1410 is connected to the collaborative search system 1420 described above. The collaborative search system 1420 integrates with the collaborative document management system 1420 and adds additional web components, content parsers, and provides access to enterprise content. The collaborative search system 1420 is connected to the content indexing system 1430, the security system 1440, and the document retention system 1450, each described separately herein.

The content indexing system 1430 provides fast access to content from various computer systems within an enterprise, including both online and offline data. The security system 1440 provides users and groups that are meaningful to a particular enterprise to facilitate searching. The security system 1440 also enforces access rights to collaborative content. The document retention system 1450 places a legal hold on documents related to a document retention request. Further details regarding the legal hold of documents will be discussed herein.

In some examples, the collaborative search system receives criteria for a search through a collaborative process. For example, one collaborative participant may create a new query for responding to a discovery request regarding a product made by the company that employs the collaborative participant. The first collaborative participant may add search criteria including the product name and then may submit the search criteria to the collaborative document management system as a collaborative document. Another collaborative participant may open the collaborative document and add additional search criteria, such as narrowing the list of departments from which documents should be searched. For example, the second participant may include the engineering, marketing, and sales teams that worked on the product. The collaborative search system may also add additional criteria inferred from the criteria added by the collaborative participants. For example, based on the company's indexed data the collaborative search system may determine that two employees, one in a department already within the search criteria and another outside of the current search criteria, frequently send email about projects. Based on this information the collaborative search system may add the user that is outside of the current search criteria to the search criteria, or may prompt one of the collaborative participants to consider adding the user to the search criteria.

Additionally, the system may add additional search criteria inferred from dynamically changing search criteria. For example, different users may commonly search for emails, such as emails that occurred at a certain time and date. The system may look at the current searching of the users and add criteria that relates to the current actions or use of the system. Additionally, the system may use heuristics type information when determining search criteria. For example, the system may identify two users are searching emails from a similar time period, and add search criteria that was added when emails from the time period were earlier searched.

In some examples, the collaborative search system defines workflows that define the set of steps that are part of completing a task. For example, a discovery request task may have the steps of determining search criteria, finding matching documents, obtaining a primary review of the documents, and obtaining a secondary review of the documents. One collaborative participant may begin the workflow by submitting criteria for a search responsive to the discovery request. As noted above, each step of the task may also be a collaborative process, such that, for example, multiple collaborative participants may contribute to determining the search criteria or performing a review of the found documents. Another collaborative participant may view and join the workflow at its current stage of completion. For example, a collaborative participant that is tasked with performing a primary review of the documents may open a collaborative document that contains the set of search results found during the search step, as described in more detail below.

In some examples, the collaborative search system creates a collaborative document based on a set of search results. The collaborative document provides a mechanism for multiple collaborative participants to contribute to steps within a workflow subsequent to the search process. In the example of a discovery request, the steps of performing various levels of review of found documents can consume the majority of the time spent responding to the discovery request. Many collaborative participants may be employed to perform the review, and each may be asked to add supplemental information to the search results that capture the results of each participant's review. For example, a collaborative participant may have the task of reviewing each document and flagging the document if it contains privileged content. The collaborative document may allow each reviewer to directly add comments to documents with the search results. Collaborative documents based on search results may contain a variety of information, such as comments related to the work flow just described, notes made by a collaborative participant to himself (such as where the review of a document was stopped before taking a break), or comments from the content's author that clarifies what the content means.

In some examples, the collaborative search system provides a user interface through which a collaborative participant may select from a set of templates that define common search tasks. For example, a collaborative participant may select a Sarbanes-Oxley template that initiates a search for materials required to be disclosed under the Sarbanes-Oxley Act. Another template may provide a discovery request workflow as described above. Other templates may allow an engineer to mine data about previous products to assist in the development of a current product. Many different templates can be created to guide collaborative participants through the steps of a search or other task. The system may also update or change the set of templates based on dynamically changing information. For example, if the system has presented the Sarbanes-Oxley template to many users and received search requests via the templates, the system may use the received request to alter the template to provide a more efficient search system. In this example, if all users search for materials using two fields (such as a company name field and a shareholder name field), and these users have had success, the system may alter the template to only initially include these two fields or to prioritize these fields. The system may perform other template adjustments in order to meet and facilitate the search of data within the system.

The user interface of the collaborative search system may include custom-developed web components to assist with the integration with the collaborative document management system. For example, Microsoft Sharepoint Server provides an object model and API for accessing collaborative features such as workflows and a search front-end that can be invoked from custom web pages using the Active Server Page Framework (ASPX). Using ASPX or other methods, custom components can be built containing scripts that dynamically build web pages for display to a collaborative participant. These web pages are dynamically produced for each collaborative participant and may list workflows to which the collaborative participant has access, collaborative documents created by the collaborative participant, templates available to the collaborative participant, and so on.

In some examples, the collaborative search system provides a user interface that does not require specialized software to be installed on the searching client system. For example, the collaborative search system may receive search criteria and display search results through a web portal that is accessible using a standard Internet web browser or graphical user interface. The collaborative search system may also provide a set of parsers for viewing content from many different sources, such as received in a list of search results, as web content. For example, the collaborative search system may provide a parser for converting a word processing document into a Hypertext Markup Language (HTML) web page. Other parsers may convert spreadsheet content, database tables, instant messaging conversation logs, email, or other structured or unstructured content into a web page format accessible via a collaborative participant's browser. In this way, heterogeneous data from many different applications is available through a unified search user interface.

Figure 15:
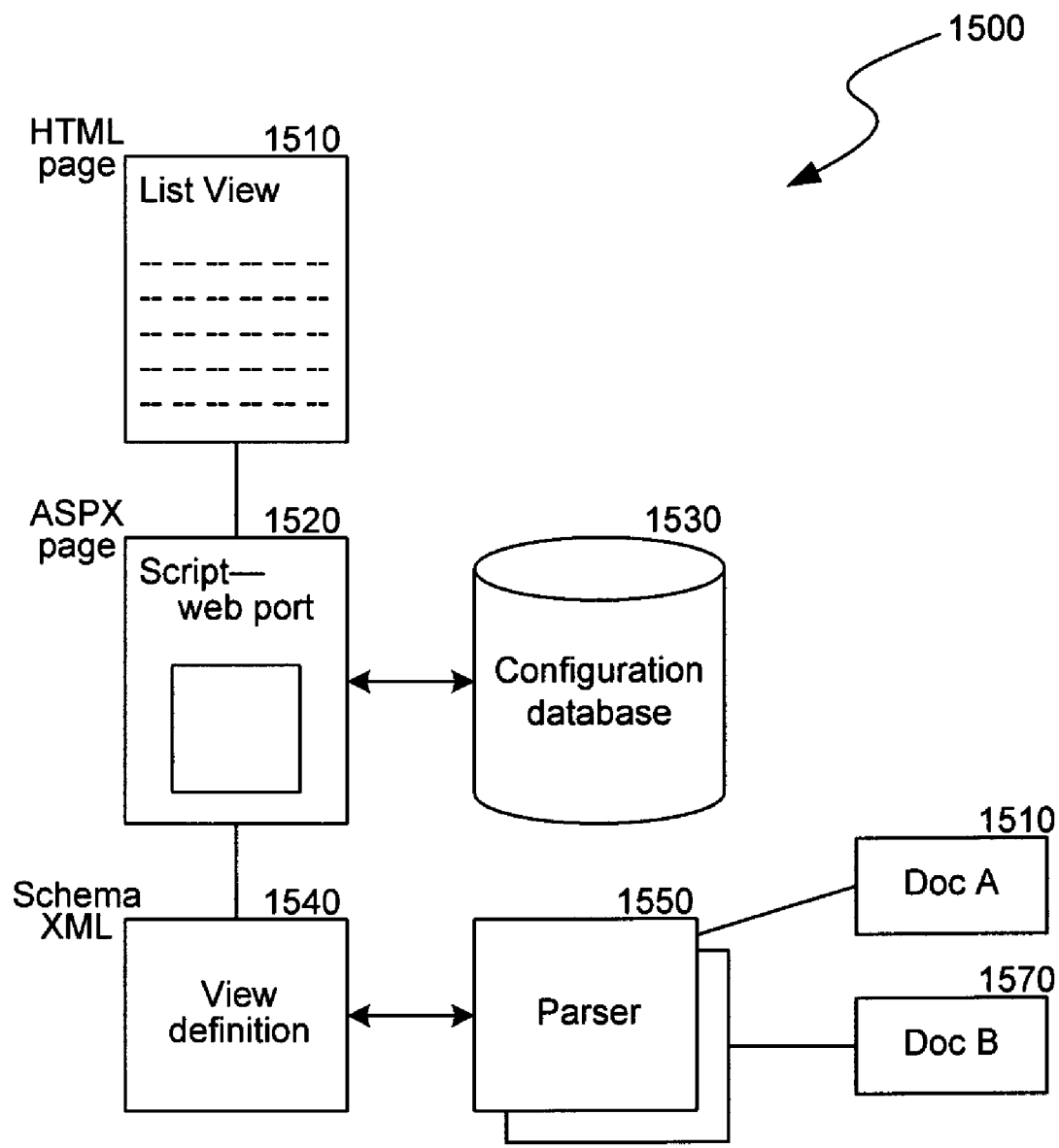
FIG. 15 is a block diagram illustrating an example integration of a content indexing system to provide access to disparate data sources.

FIG. 15 illustrates the integration of parsers with a typical collaborative document management system. The collaborative document management system 1410 contains a configuration database 1530, a schema file 1540, one or more dynamic web pages 1520, and one or more generated web pages 1510. When a collaborative participant accesses the collaborative document management system 1410, the collaborative document management system 1410 consults the configuration database to determine what to display to the collaborative participant based on factors such as the identity of the user, the particular web address the collaborative participant requested, the access rights of the collaborative participant, the state of previous requests by the collaborative participant to the collaborative document management system, and so on. Based on the determined information to display, the collaborative document management system consults the schema file 1540 to determine the layout of the information for display to the collaborative participant. The schema file 1540 may include instructions based on pre-determined layouts, dynamically determined layouts, templates to be included in the layout, and so on. At this point, one or more parsers 1550 may be consulted to migrate data from one or more document types (e.g., 1560 and 1570) to an XML or other common format. The schema data is passed to an ASPX or other dynamic page 1520 which may use scripts and an object model provided by the collaborative document management system to identify, parse data types, and dynamically build a page with the content for display to the collaborative participant. For example, the system may present one or more templates described above. After the scripts are run, the dynamic page 1520 generates an HTML or other generic formatted page 1510 that is sent to the collaborative participant's browser/GUI for display to the collaborative participant.

In some examples, the collaborative search system integrates components for making additional types of data available for searching. For example, a component may be used to provide access to an email server, such as Microsoft Exchange or Lotus Domino. Another component may provide access to database content. Third party products may be integrated with the system to provide access to some types of content. For example, FaceTime Communications, Inc. of Foster City, Calif., provides a third party product that collects instant messaging data and forwards the data to a Microsoft Exchange mailbox. Once the instant messaging is in the Exchange mailbox, the component for providing access to Microsoft Exchange data can be used to include the instant messaging content in searches.

The collaborative search system may integrate components for searching data from multiple operating systems and multiple data formats. For example, file system data on a Microsoft Windows computer system may be stored differently from file system data on a Linux computer system, but the collaborative search system may make both types of file system data available for searching. Data may be gathered from each of these types of disparate data sources and forwarded to a uniform database where the data can be collected, tagged with various classifications, and indexed for searching. The system may then display the data on differently formatted browsers.

Figure 16:
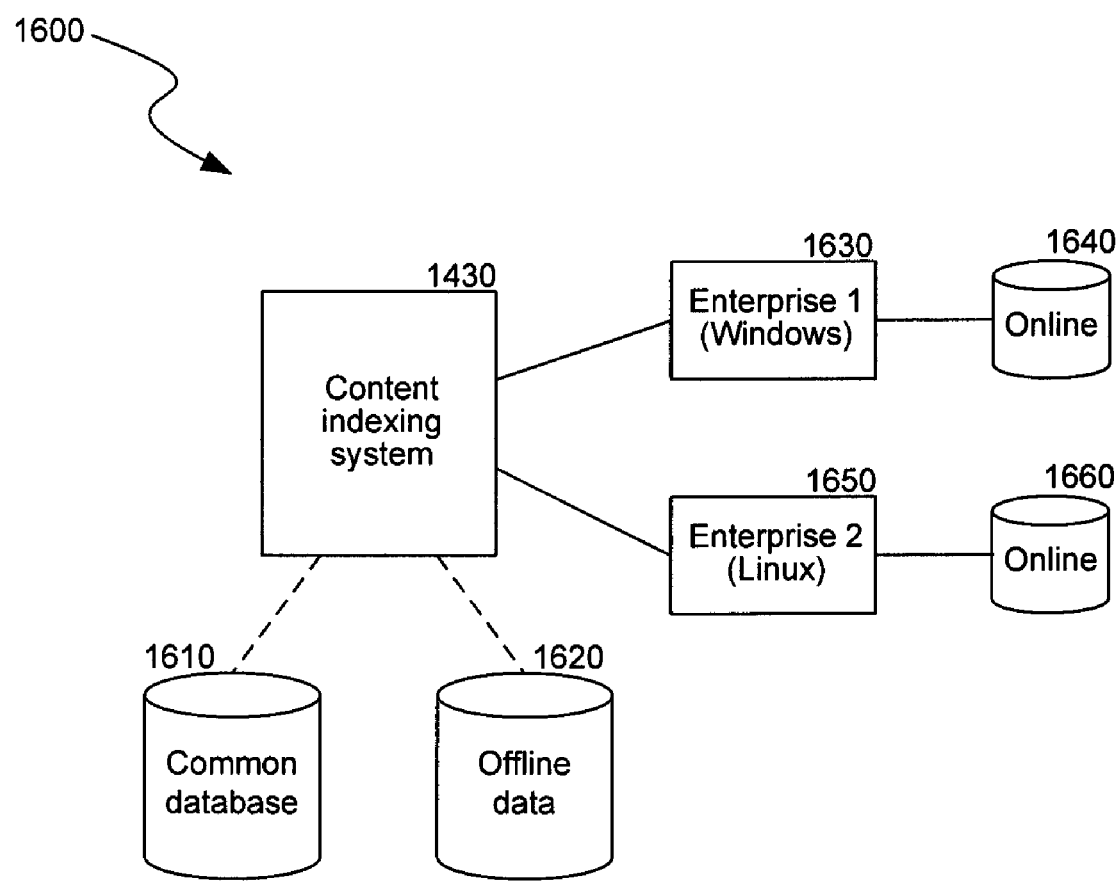
FIG. 16 is a schematic diagram illustrating integration of parsers with a typical collaborative document management system.

FIG. 16 illustrates an example of the integration of the content indexing system to provide access to disparate data sources. The content indexing system 1430 is coupled to computer systems throughout a first enterprise 1630. The computer systems in the first enterprise 1630 are connected to online data stores 1640 that contain data in a format that may be specific to the operating environment of the enterprise 1630, such as Microsoft Windows. The content indexing system 1430 may be coupled to other enterprises 1650 or departments that contain data stores 1460 with data in a format specific to another operating environment, such as Linux. The content indexing system 1430 provides uniform access to data regardless of the operating environment that produced the data or is currently storing the data. The content indexing system 1430 also provides access to offline data 1620, such as data stored in backups or in secondary copies of data from other systems, such as the first enterprise 1630. The content indexing system 1430 provides access to each of these sources of data by storing information about the data in a common database 1610. The common database 1610 contains metadata describing the data available from each of the sources of data. The common database 1610 may include system and user defined tags that separate the data into various classifications, such as confidential data, engineering data, the application used to view the data, and so on.

In some examples, the collaborative search system integrates information from a security system. For example, the collaborative search system may use Microsoft Windows Active Directory to determine users whose content should be searched as part of a discovery request. Active Directory contains all of the users in an organization and organizes the users into groups. For example, a finance group may contain all of the users in the Finance Department of a company. A discovery or other search request may include a request for information most likely held by a particular group, such as sales data managed by a sales department. The security system may also provide restrictions on access to content retrieved in response to a search. For example, a temporary worker hired to find documents for a sales pitch might not have access to documents associated with executives or documents that contain confidential company information. The collaborative search system can manage a workflow that contains steps performed by collaborative participants with varying levels of access to content. For example, a company officer may be the only collaborative participant allowed to search a particular set of documents as part of a search request, while other collaborative participants search less restricted documents.

Document Retention (LegalHold)

In some examples, the system effectively sets an "undelete" flag to put a legal hold on electronic data to prohibit it or inhibit it from being deleted. This may interoperate with the system's ability to search with data classification, especially content searching, to find documents for which the "undelete" flag should be set. The system can also search for patterns of activity, such as identifying the next ten actions performed by a given computer once previously set criteria are met (e.g., an email sent by the CEO to a particular party or regarding a given subject). The patterns of activity may be pre-determined or may be dynamically determined. For example, these patterns may include actions related to the user of the data, actions related to a computer of the user, actions related to a user's group, actions related to a project associated with the data, and so on. Thus, after a triggering event, the system tracks all communications, or even all activities, for a given user or on a given machine.

Figure 17:
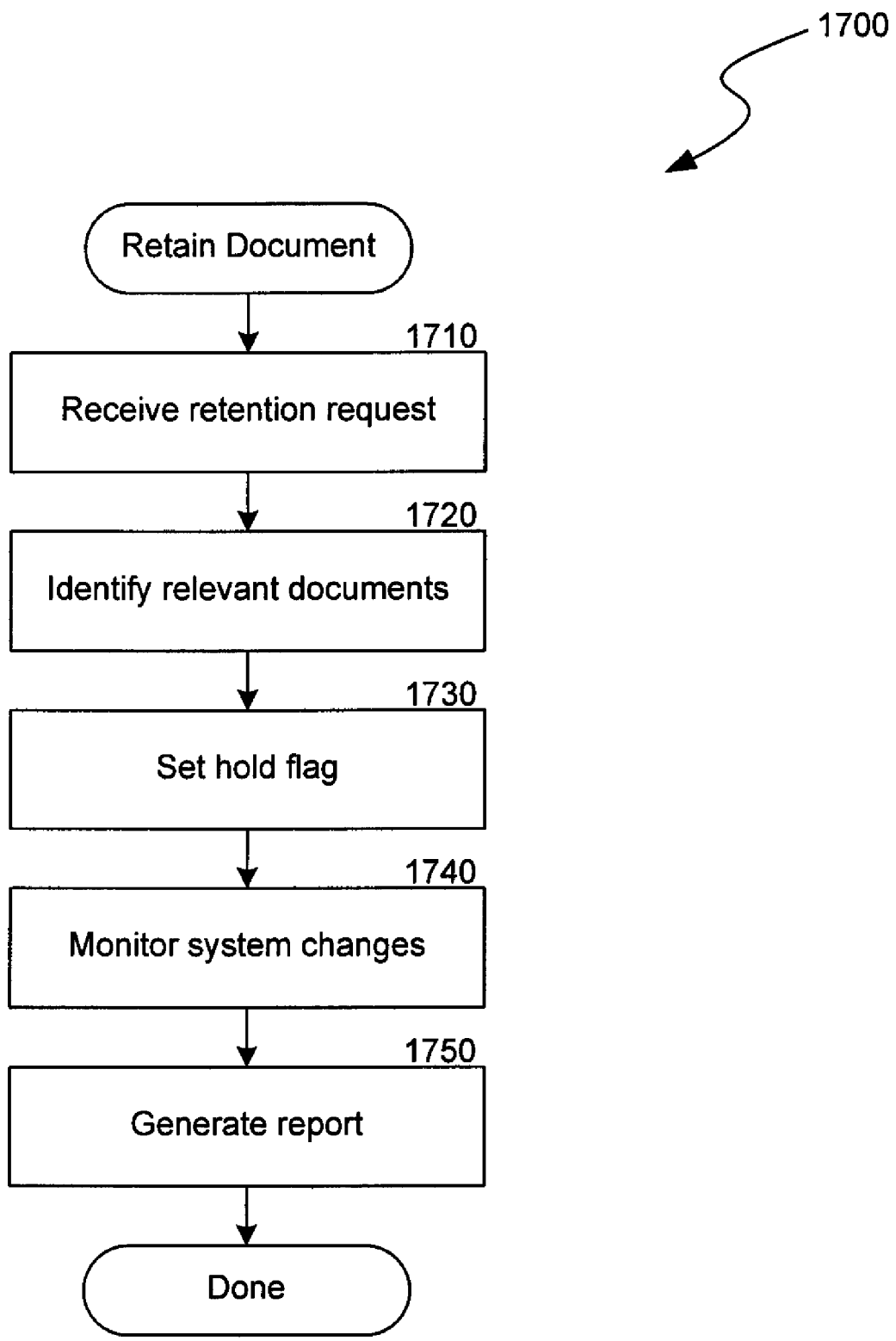
FIG. 17 is a flow diagram illustrating typical processing in response to a document retention request.

FIG. 17 is a flow diagram that illustrates a routine 1700 for processing a response to a document retention request. In step 1710, the system receives a request to retain documents. The request may identify particular documents, or it may contain criteria that can be used to identify relevant documents, such as a particular party's name, keywords, access criteria (e.g., documents accessed by the CEO of the company), and so on. In step 1720, the system identifies documents relevant to the document retention request. For example, the system may use the search facility described above to identify relevant documents. In step 1730, the system places a hold on the identified documents, such as by setting a hold or undelete flag on the documents. The hold flag prevents certain operations from being performed on the document, such as deleting the document. In step 1740, the system may continue to monitor documents for changes relevant to the retention request. For example, the system may monitor each client within a network to determine if any new documents are created that are relevant to the retention request. For example, the system may compare the documents with metadata, patterns of activity and other information related to the retention request. In step 1750, the system generates a report that identifies the relevant documents in response, for example, to a discovery request.

In some examples, the system handles all electronic data, and covers production volumes, backup volumes, single instancing, and other versions of data. In its simplest form, a storage manager and data agents help identify data that satisfy a given criteria from various locations, and via indexes generated based on all data in a network. With a single user interface, a user can request a unified search over the network to identify all data satisfying predetermined criteria. This includes identifying data satisfying the criteria on multiple levels or tiers of storage, multiple types of media, and heterogeneous platforms.

In some examples, the system can employ Bayesian file matching techniques to identify similar files. For example, the system can identify data on a primary storage device identified from a storage manager index. The system can then identify where on the secondary tier of storage the similar data is located.

In some examples, the system locks down the data using a litigation hold field or undelete field that permits that data to be written once and read many times (WORM). The system works with data that is not regularly "WORM-able." In other words, the data can be tagged to be prohibited from being deleted, but then afterwards deleted when the flag is removed.

In some examples, the system permits indexing on each client, and the ability to trap data at a client level. For example, agent software on individual computers, coupled to the network, can monitor behavior on that computer, and when certain criteria are satisfied, write out everything elsewhere to a server on the network or other storage location. Alternatively, the data can be stored in cache, and then written out later, such as when the agent recognizes that the machine has been in a quiescent state for longer than a predetermined period of time, or at a predetermined time of day. Indeed, under this alternative, the agent can copy everything new that may have occurred on the computer and stored elsewhere.

Under another alternative that stops copies from being deleted, a filter on a primary storage device traps any delete commands associated with data matching certain criteria. Secondary storage may have a litigation hold field that is effectively an undelete flag or a "preventative action field." This field is more than a simple flag, but can identify or distinguish between different "matters" such as different litigations or other events. Further, such a preventive action field can selectively enable or disable delete commands, encryption commands, move commands, and so on. For example, certain data may be flagged as being kept encrypted permanently, unless certain special criteria are met. Alternatively, certain data may be flagged as prohibited from being encrypted. Further, data may be flagged whereby it may be moved only within a given data storage tier, and not between tiers. Any job agent running on the system, such as a journaling agent, can check for whether certain criteria are met, and take appropriate actions in response.

In some examples, the system has a reporting capability where indexes at the storage manager are analyzed to identify documents matching certain terms and reports generated therefrom. In other words, the system identifies data objects that meet search criteria. The system can then cross-reference back to other search criteria, without having to associate related items based on preset classifications or certain criteria. For example, documents assigned different matter numbers may be, in fact, related, and thus identified as related under the system.

In some examples, the system identifies not only documents, but also creates a log, and thus a log report, of keystrokes by given machines, applications opened, files stored, and so on. Differential reports may be generated through a differential search among multiple reports. Such a differential report can provide a rating based on a commonality between search results among different reports. The system may rate certain reports higher than other reports. For example, the system may rate activity from a computer that created the document higher that activity from the user that created the data. Also, the system may then use the differential report when performing dynamic processing, such as those described herein.

In some examples, once data identifying certain criteria is flagged, it can be sent to a WORM device or otherwise "WORMed." Under the present system, once data has been WORM-ed, it can be unWORMed later, which is not possible with some hardware-based storage systems.

Under another alternative, the system can trap a copy and store that copy elsewhere, such as on a completely separate machine. Thus, the system can create a storage manager index associated with a separately identified machine or platform to store all documents and other electronic data meeting an electronic discovery request or other present criteria. Thus, data can quickly be moved off a user's computer and onto a separate machine coupled to the network, where that machine may be dedicated to a certain job, such as legal discovery.

In some examples, using Vault Tracker or a similar archive storage management component, the system can perform a data classification search meeting the certain criteria, identify an offsite location storing the data, automatically request the offsite media, and restore it to a particular server. Thus, the system can automatically, or semi-automatically, obtain data meeting the certain criteria, and have it restored back at a set location to respond to a legal discovery request. For example, the system may identify documents using the search criteria and retrieve secondary storage devices that include the document and other documents related to the documents or its metadata.

In some examples, the system generates an audit-ready report that identifies what electronic data the system could and could not find. For example, the report may identify all of the documents responsive to a legal discovery request as well as the current availability of those documents within the system. The documents can then be accessed if they are immediately available or retrieved from a storage library and accessed if they are stored elsewhere (e.g., in an off-site data vault). The report may be useful in cases where an organization prepares for a discovery request but does not want to devote the resources in preparing the data for discovery. Additionally, the system may use the report to identify problems with a data retention system should the report indicate that some data was not found. For example, the system may identify that all data from a certain time period was not found, and review various processes that stored data in that time period for errors and/or malfunctions. Also, the system may then proactively check other similar cases in lieu of the unfound data. Thus, the system may proactively prepare for requests using aspects of the system.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various examples described above can be combined to provide further examples. Any patents and applications and other references noted above, including any that may be listed in accompanying filing papers, are incorporated herein by reference. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the technology under the claims.

While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific examples of the system have been described herein for purposes of illustration, but that various modifications may be made without deviating from the spirit and scope of the system. Accordingly, the system is not limited except as by the appended claims.

We claim:

1. A system for rebuilding at least a portion of a signature database that reflects contents of an archive copy of a data set, comprising:
   a signature component, wherein the signature component generates a substantially unique identifier for all data objects within the data set and stores the substantially unique identifiers in a signature database, wherein the substantially unique identifier for a data object reflects contents of the data object;
   an encryption component, wherein the encryption component encrypts at least some of the data objects of the data set;
   a copy component, wherein the copy component:
      uses the generated substantially unique identifiers to identify redundant data objects in the data set and deduplicate the redundant data objects in order to create a deduplicated archive copy of the data set that comprises the encrypted data objects;
         wherein the archive copy is physically stored on sequential media; and
      stores the archive copy as one or more data chunks stored on the sequential media,
         wherein each chunk is stored with header information that includes at least one substantially unique identifier; and
      stores information related to locations of the encrypted data objects on the sequential media in a location database separate from the signature database; and
   a database rebuilding component, wherein the database rebuilding component:
      receives an indication that the signature database is unrecoverable or unavailable;
      accesses header information of at least one chunk in order to determine at least one substantially unique identifier within the header information; and
      uses the determined at least one substantially unique identifier from the header information in order to rebuild at least part of the signature database.

2. The system of claim 1, wherein the signature component uses a SHA-512 function to generate the substantially unique identifiers.

3. The system of claim 1, wherein the signature component scrambles the signature database.

4. The system of claim 1, wherein the copy component populates the location database when the archive copy that comprises the encrypted data objects is stored to locations on the sequential media.

5. The system of claim 1, wherein the copy component indexes contents of the data objects.

6. The system of claim 1, wherein the encryption component encrypts a data object after the signature component generates the substantially unique identifier for the data object.

7. A non-transitory computer-readable medium whose contents cause a data storage system to perform a method of rebuilding a deduplication index that reflects contents of an archive of data objects, the method comprising:
   identifying a data object to be stored in an archive of data objects that form a data set;
   creating a hash value for the data object, wherein creating the hash value includes calculating a hash value that represents contents of the data object;
   deduplicating the data set by:
      comparing the hash value with other hash values for data objects already stored in the archive of data objects;
      when the comparison determines that the hash value for the data object is different than the other hash values:
         encrypting a copy of the data object, and transferring the encrypted copy of the data object and the hash value to the archive of data objects, and
         storing in a file on sequential media, the transferred encrypted copy of the data object and the transferred hash value, wherein a header region of the file stores the hash value; or
      when the comparison determines that the hash value for the data object is identical to one or more of the other hash values:
         transferring the hash value that represents contents of the data object to the archive of data objects; and
         storing in a file on sequential media, the transferred hash value, wherein a header region of the file stores the hash value;
   updating an entry in a deduplication index to reflect the identification of the data object, wherein the entry is updated using the hash value;
   upon receiving an indication that the deduplication index is unavailable or unrecoverable, accessing the hash value from the header region of a data file stored on sequential media; and
   using the accessed hash value to rebuild a portion of a new, rebuilt version of the deduplication index.

8. The computer-readable medium of claim 7, wherein the data object is identified from a primary copy of a set of data objects.

9. The computer-readable medium of claim 7, wherein the data object is identified from one or more of secondary copies of a set of data objects.

10. The computer-readable medium of claim 7, wherein the data object is identified when the data storage system receives a request from a user to store a copy of the data object in the archive of data objects.

11. A method for rebuilding at least a portion of a single instancing index containing hash values that represent contents of a single instanced data set, comprising:
   single instancing a data set in order to create a single instanced data set organized as an archive file and physically stored on one or more magnetic tapes, wherein the single instancing further comprises:
      calculating substantially unique hash values that represent the data set,
      storing at least some of the calculated hash values that represent the data set in a single instancing index, and
      storing the calculated hash values within headers of one or more data files that form part of the archive file, wherein the one or more data files are separate from the single instancing index and also store at least a subset of the data set, and wherein the one or more data files are stored on the one or more tapes;

receiving an indication that at least part of the single instancing index storing hash values that represent the data set is unrecoverable or unavailable;

in response to receiving the indication, identifying at least one data file that forms part of the archive file on the one or more tapes;

extracting stored hash value information from a header of the identified at least one data file that forms part of the archive file; and, adding the extracted hash value information to a new, rebuilt version of the single instancing index.

12. The method of claim 11, further comprising:

encrypting the one or more data files that form part of the archive file;

decrypting the identified at least one data file to gain access to the stored hash value information from the header of the identified at least one data file; and re-encrypting the decrypted at least one data file.

13. The method of claim 11, further comprising:

receiving a request to restore a data object; and using the new, rebuilt version of the single instancing index to locate the data object within the archive file.

* * * * *